(12) United States Patent
Sarkar

(10) Patent No.: US 7,538,470 B2
(45) Date of Patent: May 26, 2009

(54) MONOLITHIC NANOSCALE ACTUATION

(75) Inventor: Niladri Sarkar, Richardson, TX (US)

(73) Assignee: Zyvex Labs, LLC, Richardson, TX (US)

( * ) Notice: Subject to any disclaimer, the term of this patent is extended or adjusted under 35 U.S.C. 154(b) by 239 days.

(21) Appl. No.: 11/422,229

(22) Filed: Jun. 5, 2006

(65) Prior Publication Data

US 2007/0278896 A1 Dec. 6, 2007

(51) Int. Cl.
*H02N 10/00* (2006.01)
*H01L 41/04* (2006.01)

(52) U.S. Cl. .................. 310/306; 310/311
(58) Field of Classification Search ............ 310/306, 310/307, 311, 323.01–323.21, 328, 330–332
See application file for complete search history.

(56) References Cited

U.S. PATENT DOCUMENTS

| | | | | |
|---|---|---|---|---|
| 5,631,463 | A * | 5/1997 | Kawasaki et al. ........... 250/306 |
| 5,656,769 | A * | 8/1997 | Nakano et al. ............. 73/105 |
| 6,666,075 | B2 | 12/2003 | Mancevski et al. |
| 6,806,991 | B1 * | 10/2004 | Sarkar et al. .............. 359/290 |
| 6,955,078 | B2 | 10/2005 | Mancevski et al. |
| 6,995,368 | B2 | 2/2006 | Wen et al. |
| 2004/0200281 | A1 * | 10/2004 | Kenny et al. ............. 73/514.33 |
| 2006/0016986 | A1 | 1/2006 | Wen et al. |
| 2007/0103029 | A1 * | 5/2007 | Fedder et al. ............. 310/307 |

OTHER PUBLICATIONS

Olson, et al., "Fabrication of Cantilever Probes with Integrated Piezoresistive Read-Out and Built-In Piezoelectric Actuators," Proceedings of SPIE—5717, MEMS/MOEMS Components and Their Applications II, Albert K. Henning, Editor, Jan. 2005, pp. 167-174.
Singh, "A Bone-Material-Based Sensor," Engineering in Medicine and Biology Society, 2004. IEMBS '04. 26th Annual International Conference of the IEEE, Sep. 1-5, 2004, vol. 1, pp. 2078-2079.
Huang et al., "Study of Injection Molding Pressure Sensor with Low Cost and Small Probe", Sensors and Actuators A: Physical, vol. 101, No. 3, Oct. 30, 2002, pp. 269-274(6).

* cited by examiner

*Primary Examiner*—Quyen P Leung
*Assistant Examiner*—Derek J Rosenau
(74) *Attorney, Agent, or Firm*—Haynes and Boone, LLP

(57) ABSTRACT

An apparatus including an actuator configured for controllable deflection, and also including a piezoresistive element integral to the actuator and having first and second piezoresistive portions and a plurality of contacts. One of the plurality of contacts is configured to pass a received feedback signal through the first and second piezoresistive portions. Detection of the actuator deflection is indicated by comparison of the feedback signal as detected via at least one of the plurality of contacts that are interposed by at least one of the first and second piezoresistive portions.

13 Claims, 24 Drawing Sheets

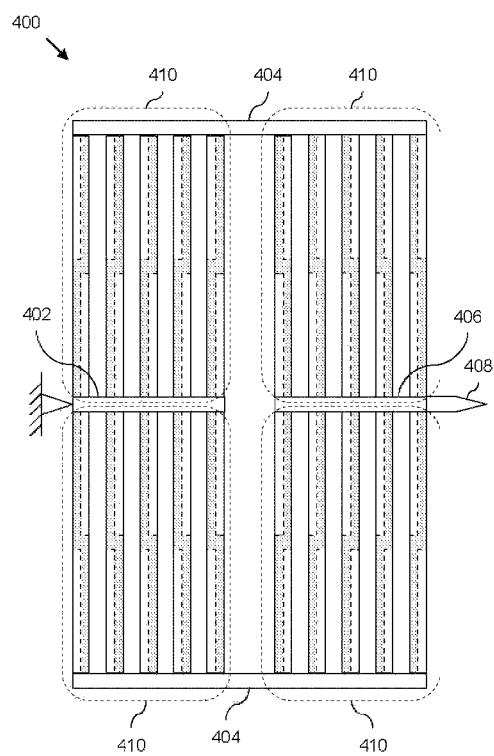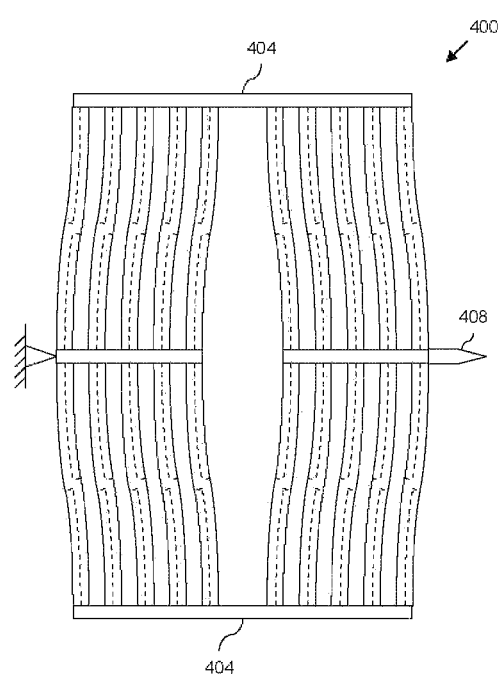
Fig. 8
Fig. 9

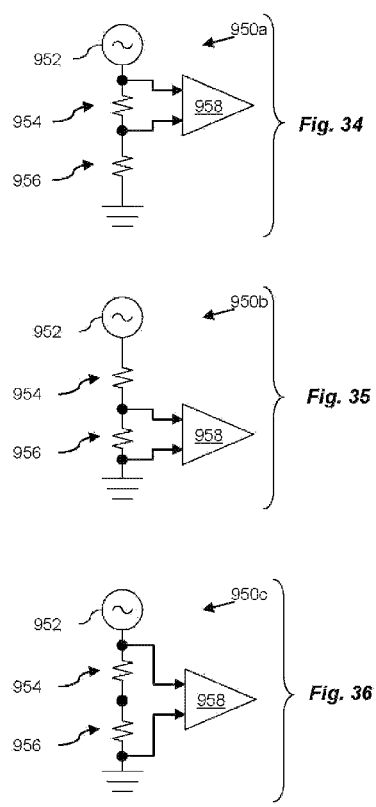
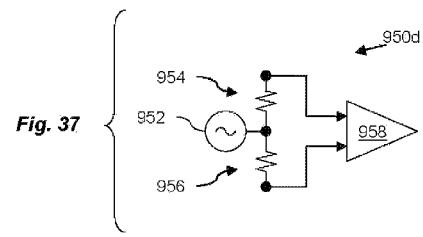
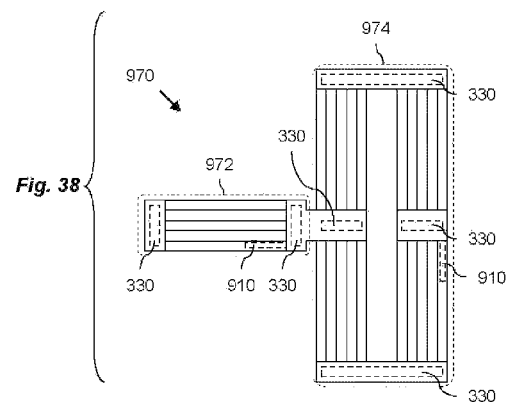

MONOLITHIC NANOSCALE ACTUATION

BACKGROUND

Present microscale and nanoscale manipulators often do not provide adequate mechanisms for one or more various applications, such as manipulating a sample being imaged in an electron microscope, or assembling microscale and nanoscale assemblies. For example, many such manipulators do not provide sufficient positional resolution, or provide limited degrees of freedom during manipulation. Existing manipulators also provide no means for adaptable or modular end effectors, and often require numerous vacuum feedthroughs for power, signal and control lines to be fed into the examination chamber of the electron microscope. Furthermore, existing manipulators may provide limited or no electrical, thermal or other interaction with objects being manipulated, and require extensive and otherwise complicated probe processing/change-out procedures. Existing manipulators, their manufacture and their operation are also not easily integrated with existing manufacturing processes, such as those employed in the manufacture of silicon-based transistor and other microelectronic devices.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 8 and 9 are top views of at least a portion of one embodiment of apparatus according to aspects of the present disclosure.

FIGS. 34-37 are circuit diagrams each of at least a portion of various embodiments of apparatus according to aspects of the present disclosure.

FIG. 38 is a top view of at least a portion of one embodiment of apparatus according to aspects of the present disclosure.

DETAILED DESCRIPTION

Figure 1:
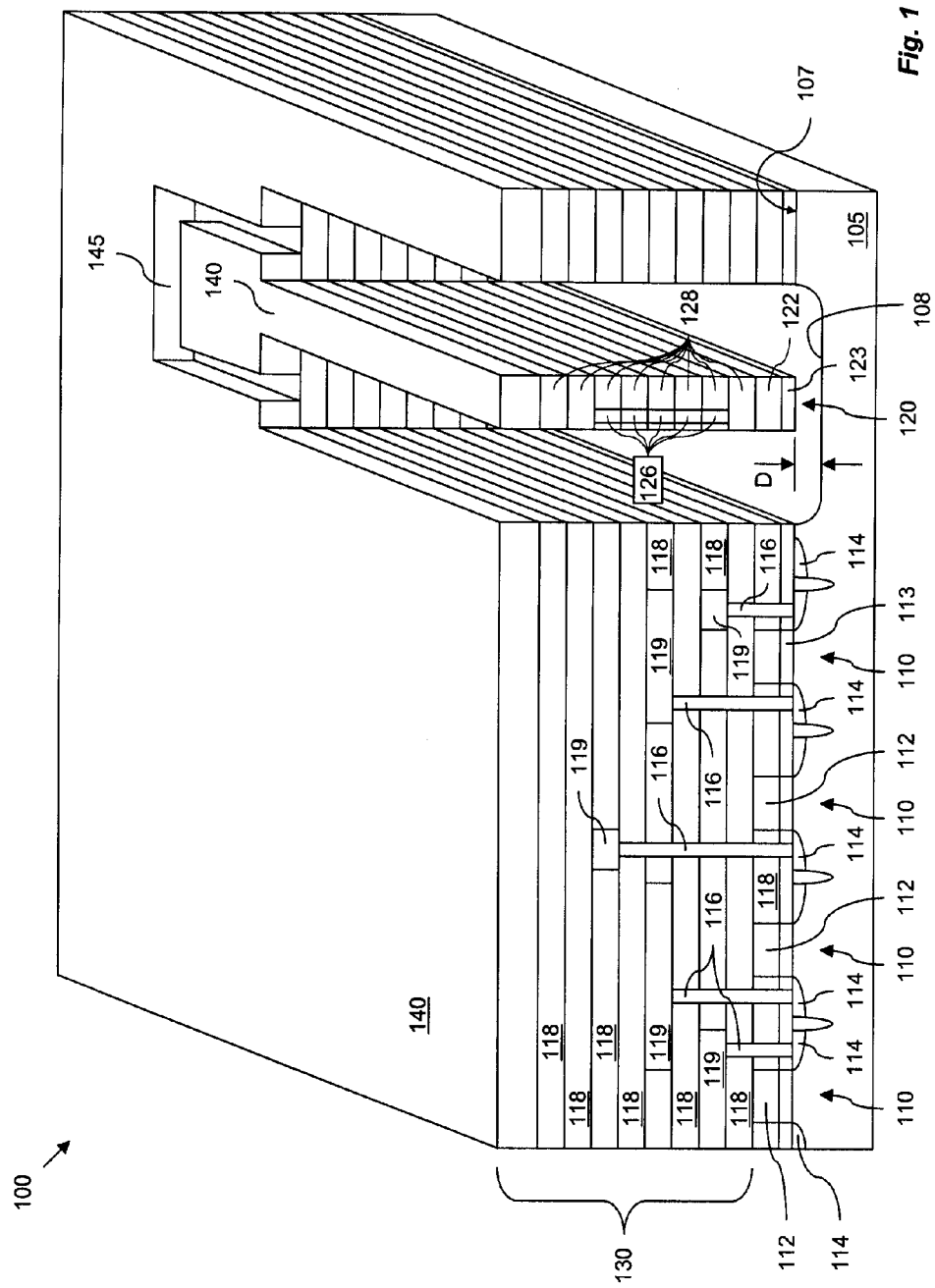
FIG. 1 is a perspective view of at least a portion of one embodiment of apparatus according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity, and does not in itself dictate a relationship between the various embodiments and/or configurations discussed.

Referring to FIG. 1, illustrated is a perspective view of at least a portion of one embodiment of an apparatus 100 in an intermediate stage of manufacture according to aspects of the present disclosure. The apparatus 100 includes transistor devices 110 and at least one actuator 120, as well as an interconnect structure 130 interconnecting ones of the transistor devices 110 and, possibly, the actuator 120. Each of the transistor devices 110 may be substantially similar in size, composition, function, operation or otherwise, although other embodiments may include variation among these and other characteristics of the transistor devices 110. Similarly, in embodiments which include more than one actuator 120, the actuators 120 may be substantially similar or may vary in size, composition, function, precision, operation or otherwise. The transistor devices 110 may be or include one or more memory and/or logic devices formed from, without limitation, field effect transistors (FETs), metal-oxide-semiconductor FETs (MOSFETs), and/or complimentary MOSFETs (CMOS), among others.

The transistor devices 110 may be formed by conventional and/or future-developed processes, and may be conventional in composition. Thus, the scope of the present disclosure is not limited to the compositions or manufacturing processes of the various embodiments described herein, but rather includes additional compositions and manufacturing processes, including many conventional and future-developed processes.

The transistor devices 110 may be formed on and/or in a substrate 105, which may be or include a bulk silicon, germanium or other semiconductor substrate, a silicon- or other semiconductor-on-insulator substrate (SOI), a buried oxide (BOX) layer, or another type of substrate. Each transistor device 110 includes a control electrode, gate, gate stack or gate electrode 112 (hereafter "gate 112") at least partially comprising a piezoresistive material or composition, such as doped silicon, among others. The piezoresistive material may have a resistance which changes under physical pressure or mechanical work, such that its internal resistance may change when subjected to strain or deflection, where the internal resistance may remain changed until the material's original position is restored. Each gate 112 may be formed in juxtaposition between corresponding source/drain regions 114, such as in a lateral direction relative to a major surface 107 of the substrate 105. Each gate 112 may also be electrically isolated from the substrate 105 and/or features formed therein by one or more gate dielectric layers 113.

One or more contacts, vias, interconnects and/or other conductive members 116 (hereafter "conductive members 116") may extend from one or more of the source/drain regions 114 and/or gates 112. The interconnect structure 130 comprises at least portions of the conductive members 116 and surrounding dielectric layers 118, and possibly one or more additional interconnects or other conductive members (hereafter "conductive members 119") which may generally extend substantially parallel to the surface 107 of the substrate 105 between ones of the conductive members 116.

The actuator 120 may be substantially similar in composition and/or manufacture to corresponding portions of the transistor devices 110 and/or the interconnect structure 130. For example, the actuator 120 may include a piezoresistive portion 122 which may be substantially similar in composition and manufacture to one or more of the gates 112 of the transistor devices 110. In one embodiment, the piezoresistive portion 122 may be formed substantially simultaneously with the gates 112. A thin dielectric layer 123 may be formed between the piezoresistive portion 122 and the substrate 105, although this layer 123 may be a sacrificial layer or otherwise be removed during subsequent fabrication processing.

The actuator 120 may also include conductive portions 126 interspersed among dielectric portions 128, where the conductive portions 126 may be substantially similar in composition and manufacture to the conductive members 116 and/or 119, and the dielectric portions 128 may be substantially similar in composition and manufacture to the dielectric layers 118. In one embodiment, the conductive portions 126 may be formed substantially simultaneously with the conductive portions 116 and/or 119, and/or the dielectric portions 128 may be formed substantially simultaneously with the dielectric layers 118.

Moreover, as in the embodiment shown in FIG. 1, a portion of the substrate 105 may be removed to form a substrate recess 108, thereby releasing at least a portion of the actuator 120 from the substrate 105. The recess 108 may be formed by one or more isotropic and/or anisotropic etching processes, and/or other material removal processes, which may be performed after the actuator 120 is substantially completed or during an intermediate stage of manufacture. In one embodiment, the recess 108 may have a depth D ranging between about 50 nm and about 50,000 nm, although other depths D are also within the scope of the present disclosure. The recess 108 may allow deflection of the actuator 120 in a direction towards the substrate 105, relative to an as-fabricated orientation of the actuator 120.

Where portions of the actuator 120 may be formed substantially simultaneously with portions of the transistor devices 110 and/or the interconnect structure 130, such formation may include performing one or more processes each of which forms or partially forms corresponding portions of the actuator 120 and the transistor devices 110 and/or the interconnect structure 130. Such processes may include one or more deposition, growth, etching, planarizing, masking, and/or other manufacturing processes employable to form transistor, microelectromechanical (MEMS), nanoelectromechanical (NEMS), optoelectrical, optomechanical, and/or other devices having micro- and/or nano-scale feature dimensions.

For example, one or more of the gates 112 of the transistor devices 110 and at least a portion of the piezoresistive portion 122 of the actuator 120 may be substantially simultaneously formed by forming a mask, sacrificial layer, or other feature (s) having openings substantially defining the location, shape and size of the gates 112 and piezoresistive portion 122. Thereafter, a piezoresistive layer may be grown or deposited in the openings, possibly filling a substantial portion of the openings or even protruding out of the openings (e.g., covering at least a portion of an upper surface of the mask or sacrificial layer, relative to the substrate 105). One or more chemical-mechanical planarizing or polishing processes (hereafter "CMP processes") may then be employed to remove a portion of the piezoresistive material, such as from the upper surface of the mask or sacrificial layer. The mask or sacrificial layer may then be substantially removed, such as by one or more etching, ashing, rinsing, and/or other processes. A portion of at least one of the dielectric layers 18 may then be formed around and possibly over the thus formed gates 112 and piezoresistive portion 122, possibly by a similar series of one or more material addition processes (e.g., deposition, growth) and one or more material removal processes (e.g., CMP, etching).

The apparatus 100 may also include one or more additional layers 140 over the interconnect structure 130 and/or the actuator 120. The additional layer(s) 140 may include a metallization layer, such as may define or otherwise include one or more bond pads or contacts. The additional layer(s) 140 may also or alternatively include passivation, such as may protect underlying features from contaminants, mechanical shock, and/or other environmental hazards. In one embodiment, the one or more additional layers 140 may be employed to define at least a portion of the actuator 120 and/or the recess 108, such as during one or more etching and/or other material removal processes. Moreover, as in the embodiment shown in FIG. 1, a portion of the one or more additional layers 140 that partially or substantially conforms to the footprint of the actuator 120 may be electrically and/or physically isolated from one or more portions of the additional layer(s) 140 that correspond to the footprint of the transistor devices 110 and/or the interconnect structure 130. Such isolation may comprise one or more trenches or recesses 145 which may be filled or otherwise substantially contain a dielectric or otherwise insulating material, such as silicon (doped or undoped), one or more oxides, air, inert gas, and/or vacuum.

Figure 2:
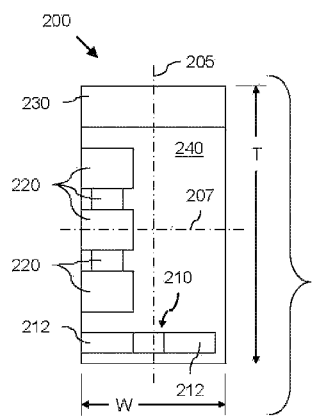
FIG. 2 is a sectional view of at least a portion of one embodiment of apparatus according to aspects of the present disclosure.

Referring to FIG. 2, illustrated is a sectional view of at least a portion of one embodiment of the actuator 120 shown in FIG. 1, herein designated by the reference numeral 200. As with the actuator 120 shown in FIG. 1, the actuator 200 includes a piezoresistive portion 210, conductive members 220, and one or more additional layers 230, where each of these features 210, 220, 230 may be substantially similar in composition, manufacture and/or otherwise to corresponding features of the actuator 120 described above. A plurality of dielectric layers 240 may isolate the conductive members 220 from the piezoresistive portion 210, the additional layers 230, and/or other features, where the dielectric layers 240 may be substantially similar in composition and manufacture to the dielectric layers 118 shown in FIG. 1.

The piezoresistive portion 210 may comprise a number of elongated sections 212 each spanning a substantial length of the actuator 200, two or more of which may be electrically connected to form a circuit loop, such as in embodiments described below. The elongated sections 212 may have a substantially symmetric orientation relative to a vertical midplane 205 of the actuator 200, or the piezoresistive portion 210 may otherwise be substantially centered relative to the actuator 200. However, the piezoresistive portion 210 may alternatively be offset relative to the midplane 205, such as in the embodiment shown in FIG. 2. The piezoresistive portion 210 may also form a lower surface or boundary of the actuator 200, while in other embodiments one or more of the dielectric layers 240 may interpose such lower surface or boundary and the piezoresistive portion 210, as in the illustrated embodiment.

The conductive members 220 may include one or more members from one or more conductive layers, possibly being interconnected by vias, plugs and/or other conductive features. In the illustrated embodiment, the conductive members 220 include members from three such conductive layers, which are interconnected by two vias. Each of the conductive members 220 may span a substantial length of the actuator 200, such that each adjacent pair of the conductive members 220 may be connected by a series vias spaced along such length, although one or more trench-shaped vias may additionally or alternatively be employed to connect neighboring ones of the conductive members 220.

The conductive members 220 may also be offset from the vertical midplane 205, as in the embodiment shown in FIG. 2. Consequently, because the conductive members 220 and the dielectric layers 240 have different thermal expansion coefficients, an increase in the temperature of the conductive members 220 and the dielectric layers 240 causes the actuator 200 to deflect towards the direction of the decreasing thermal expansion coefficient gradient (e.g., substantially perpendicular to the midplane 205 in the embodiment of FIG. 2). The actuator 200 may also be configured such that the conductive members 220 may be sufficiently heated to cause such deflection without also heating the piezoresistive portion 210 an amount sufficient to also cause deflection in a second direction (e.g., where such secondary deflection may not be desired). Nonetheless, the piezoresistive portion 210 may also have a thermal expansion coefficient that is substantially different relative to the dielectric layers 240 and/or the conductive members 220 to intentionally permit deflection of the actuator 200 in another direction (e.g., substantially parallel to the midplane 205).

The differences between the thermal expansion coefficients of the conductive members 220, the piezoresistive portion 210 and/or the dielectric layers 240 may thus be selected to attain the desired direction(s) of the deflection of the actuator 200 when these features are heated. For example, the conductive members 220 may be oriented substantially symmetrical relative to the midplane 205 but offset from a horizontal midplane 207, thereby permitting deflection of the actuator 200 in a direction that is substantially parallel to the midplane 205. In another embodiment, the conductive members 220 may be offset from both midplanes 205, 207, thereby permitting deflection of the actuator 200 in a direction that is not parallel to either of the midplanes 205, 207.

The dimensions of the actuator 200 may vary within the scope of the present disclosure. However, in one embodiment, the actuator 200 (or a member, beam section, released portion, or other portion of the actuator 200) may have a thickness T ranging between about 50 nm and about 10,000 nm, a width W ranging between about 50 nm and about 5000 nm, and/or an aspect ratio (T:W) ranging between about 0.5 and about 10. For example, the actuator 200 may have a thickness T about equal to 1000 nm and a width about equal to 250 nm, thus having an aspect ratio of about 4:1.

Figure 3:
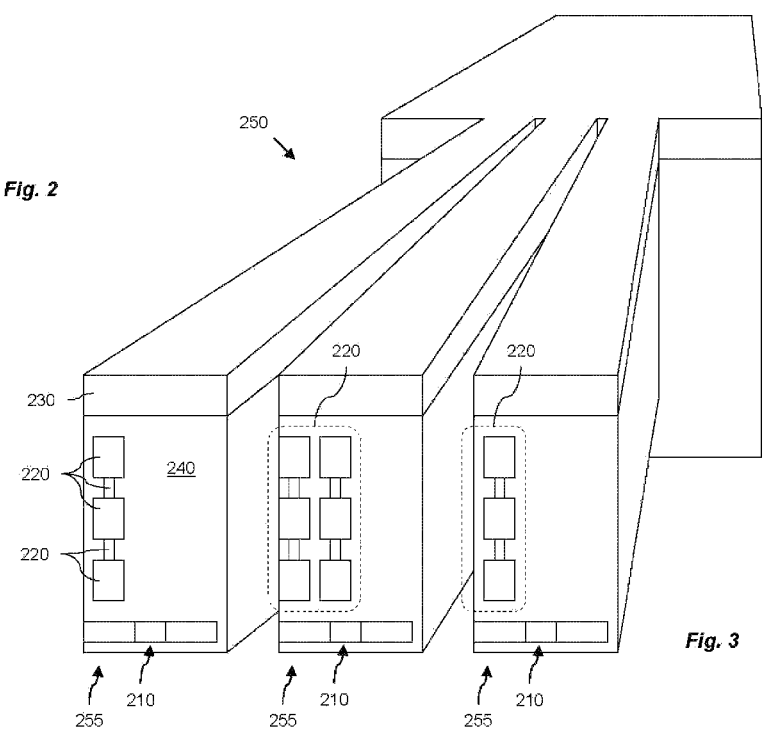
FIG. 3 is a perspective view of at least a portion of one embodiment of apparatus according to aspects of the present disclosure.

Referring to FIG. 3, illustrated is a perspective view of at least a portion of an embodiment of the actuator 200 shown in FIG. 2, herein designated by the reference numeral 250. The actuator 250 includes three actuating members 255, each of which may be substantially similar to the actuator 200 shown in FIG. 2. Each actuator member 255 may also be substantially similar to each other or, as in the embodiment of FIG. 3, various features or other aspects of the independent actuator members 255 may vary. For example, the number, location and/or orientation of the conductive members 220 may vary among the actuator members 255. In another embodiment, one or more of the actuator members 255 may not include features included in others of the actuator members 255. For example, one or more of the actuator members 255 may not include a piezoresistive portion 210.

Figure 4:
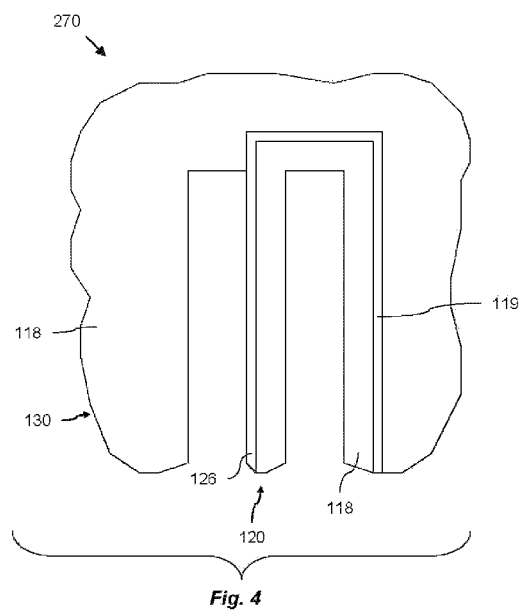
FIGS. 4 and 5 are top views of at least a portion of one embodiment of apparatus during subsequent stages of manufacture according to aspects of the present disclosure.

FIG. 4 is a top view of at least a portion of one embodiment of the apparatus 100 shown in FIG. 1, herein designated by reference numeral 270. Referring to FIG. 4 with continued reference to FIG. 1, the apparatus 270 is depicted in FIG. 4 in an intermediate stage of manufacture according to aspects of the present disclosure, during which one of the layers of conductive members 119 and 126 is formed. One of the conductive members 126 may extend along a substantial length of the actuator 120, and may also extend into the interconnect structure 130, thereby forming a portion of the interconnect structure 130. For example, the conductive member 126 and one of the conductive members 119 may be integrally formed, as shown in FIG. 4. Consequently, the conductive member 126 may be interconnected with one or more of the transistor devices 110 interconnected by the interconnect structure 130.

Figure 5:
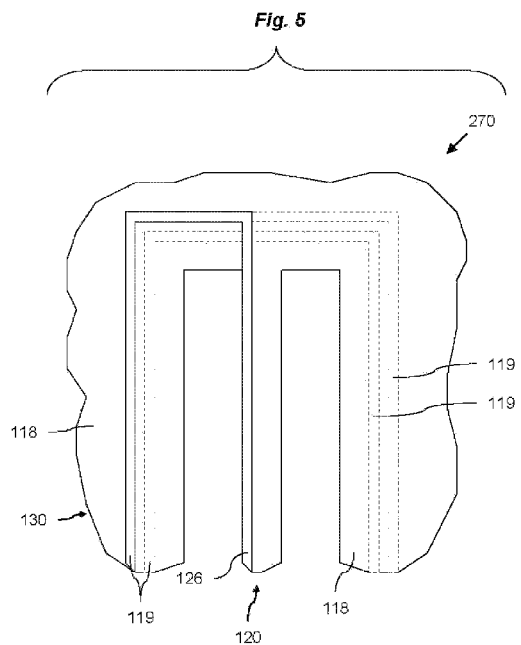

FIG. 5 is a top view of the apparatus 270 shown in FIG. 4 in a subsequent stage of manufacture according to aspects of the present disclosure, in which additional dielectric layers 118 and layers of conductive members 119 and 126 have been formed. Referring collectively to FIGS. 1, 4 and 5, additional ones of the conductive members 126 of the actuator 120 may also extend from the actuator 120 for interconnection with the interconnect structure 130. Consequently, several or all of the conductive members 126 of the actuator 120 may be interconnected with one or more of the transistor devices 110. One of more of the conductive members 126 of the actuator 120 may ultimately extend or be interconnected with a bond pad or other terminal providing an electrical interface of the apparatus 270, possibly via one or more portions of the interconnect structure 130 and/or the transistor devices 110.

Of course, each of the conductive members 126 ultimately formed in the actuator 120 may not extend from the actuator 120 for interconnection with the interconnect structure 130. For example, one of more of the conductive members 126 may be electrically isolated from any conductive feature outside the boundaries of the actuator 120, such as by portions of one or more of the dielectric layers 118. These isolated conductive members 126 may thus be primarily employed for temperature-dependent deflection as opposed to being additionally or alternatively employed to transferring control and/or data signals.

Figure 6:
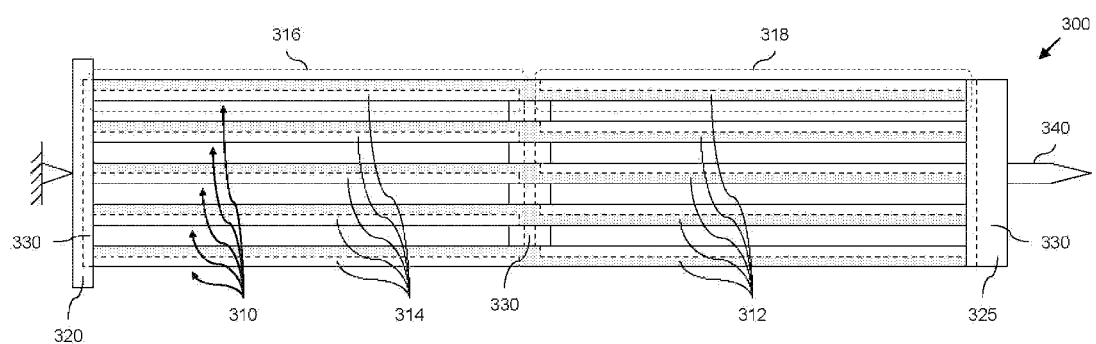
FIGS. 6 and 7 are top views of at least a portion of one embodiment of apparatus according to aspects of the present disclosure.

Referring to FIG. 6, illustrated is a top view of at least a portion of one embodiment of an apparatus 300 according to aspects of the present disclosure. The apparatus 300 represents one environment in which the apparatus 100, 200, 250 and/or 270 described above may be implemented. For example, the apparatus 300 includes actuator members 310 extending between an anchored end 320 and an actuated end 325, and one or more of the actuator members 310 may be substantially similar to the actuator 120 shown in FIGS. 1 and/or 4, the actuator 200 shown in FIG. 2, and/or the actuator members 255 shown in FIG. 3. That is, each actuator member 310 may include a plurality of conductive members 312 oriented within one or more dielectric layers 314 and configured for temperature-dependent deflection. Each of the actuator members 310 may be substantially similar to each other, as in the embodiment depicted in FIG. 6, while in other embodiments one of more of the actuator members 310 may vary from others.

Each actuator member 310 may include a first region 316 and a second region 318. Within each actuator member 310, the conductive member 312 may be offset in a first direction within the first region 316, and the conductive member 312 may be offset in a second direction within the second region 318. The first and second directions may be substantially opposite directions (e.g., antiparallel), although other embodiments are also within the scope of the present disclosure. In some embodiments, the varied offset direction may aid in maintaining the parallelism of the actuated end 325 relative to an anchored end 320. For example, the first and second regions 316, 318 may be substantially complementary, such that an angular deflection of the first region 316 at a given temperature is substantially equal in magnitude to an opposite angular deflection of the second region 318 at the same temperature.

The temperature of the conductive members 312 may be controlled by control of one or more heating elements 330 proximate the conductive members 312. In one embodiment, the heating elements 330 comprise piezoresistive material, such as the piezoresistive portions 122, 210 described above. For example, the actuator members 310 may include piezoresistive heating elements 330 having patterns substantially conforming to those of the conductive members 312. Additionally, or alternatively, one or more central heating elements 330 may be located in or near the actuated end 320, the anchored end 325, a midpoint of the actuator members 310, or otherwise positioned so as simultaneously control the temperature of each or several of the conductive members 312. For example, where the conductive members 312 comprise metal or other materials of high thermal conductivity, the temperature of even the portions of the conductive members 312 that are distal from the heating elements 330 may be controlled by the heating elements 330.

The piezoresistive heating elements 330 may be operable to increase in temperature in response to electrical current passed therein, thus allowing thermal energy to be radiated and/or conducted towards the conductive members 312. Additionally, or alternatively, other means of affecting the temperature of the conductive members 312 my be employed, such as laser heating, chamber heaters, and/or others.

The apparatus 300 may also include at least one end effector 340 coupled to or otherwise extending from the actuated end 325 or other portion of the apparatus 300. The end effector 340 may be or include one or more probes, grippers, tweezers, connectors, and/or combinations thereof, among other embodiments. In one embodiment, one or more of the conductive members 312 of one or more of the actuator members 310 may provide an electrical path from the end effector 340 to components, assemblies and/or other features connected to or otherwise associated with the apparatus 300. For example, these conductive members 312 may interconnect the end effector to one or more memory, logic, communications, processing, and/or other devices, including those which may be at least partially formed by an interconnected array of transistor devices, such as in the embodiment shown in FIG. 1 and described above. In one embodiment, the end effector 340 may thus communicate with the external devices, including via two or more communication paths, such as where the end effector 340 include multiple contact points, terminals and/or other interfaces.

Figure 7:
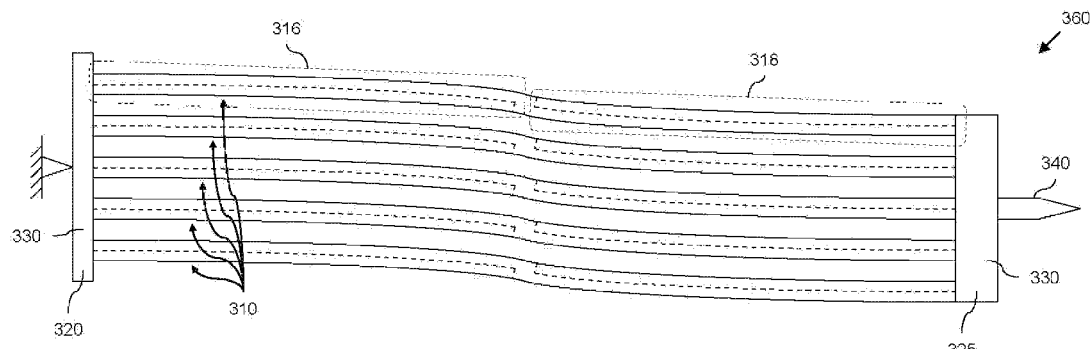

Referring to FIG. 7, illustrated is a top view of at least a portion of one embodiment of the apparatus 300 shown in FIG. 6, herein designated by the reference numeral 360. The apparatus 360 is substantially similar to the apparatus 300 shown in FIG. 6, but includes heating elements which substantially conform to at least portions of the conductive members 312 and, thus, are not visible in the view shown in FIG. 7. Moreover, because the apparatus 360 does not include the heating elements 330 at the midpoints of the actuator members 310, as does the apparatus 300, the actuator members 310 are not connected at their midpoints.

In the orientation depicted in FIG. 7, the apparatus 360 has been actuated in the manner described above. Consequently, the first regions 316 of the actuator members 310 have each deflected in a first direction, and the second regions 318 of the actuator members 310 have each deflected in a second, substantially opposite direction. Accordingly, the actuated end 325 has been repositioned yet remains substantially parallel to the anchored end 320. The precision of such positioning may vary among the myriad embodiments within the scope of the present disclosure. In one embodiment, the positioning of the end effector 340 may be precise to within about 5 nm. Moreover, the total possible travel of the end effector that is attainable with the apparatus 360 (and others within the scope of the present disclosure) may be about 500 nm in one embodiment, although this value may vary within the scope of the present disclosure.

Referring to FIG. 8, illustrated is a top view of at least a portion of one embodiment of an apparatus 400 according to aspects of the present disclosure. The apparatus 400 represents one environment in which the apparatus 300 and/or 360 described above may be implemented. For example, the apparatus 400 includes actuators 410, where one or more of the actuators 410 may be substantially similar to the apparatus 300 shown in FIG. 6 and/or the apparatus 360 shown in FIG. 7. The illustrated embodiment of the apparatus 400 includes four actuators 410, although other embodiments may include fewer or greater actuators 410.

The apparatus 400 also includes one or more connecting members, regions or junctions where two or more of the actuators 410 may intersect or be coupled. For example, in the illustrated embodiment, one such connection 402 anchors two of the actuators 410, two connections 404 each coupling one of the anchored actuators 410 to another actuator 410, and another connection 406 may provide an end effector or end effector interface 408 (hereafter "end effector 408") proximate the junction or intersection of the two un-anchored actuators 410.

The actuators 410 may be configured such that deflection of the conductive members therein operates to translate the end effector 408 in substantially one direction. For example, in the illustrated embodiment, each of the anchored actuators 410 is paired with an unanchored actuator 410 having a substantially mirror-image configuration. Consequently, deflection of one of the actuators 410 in an undesired direction may be mitigated or substantially offset by deflection of its paired actuator 410 in an opposite direction. Thus, as shown in FIG. 9, the apparatus 400 may provide single degree-of-freedom (DOF) actuation of the end effector 408, although such single DOF actuation of the end effector 408 may be accompanied by an inward translation of each of the connections 404.

Figure 10:
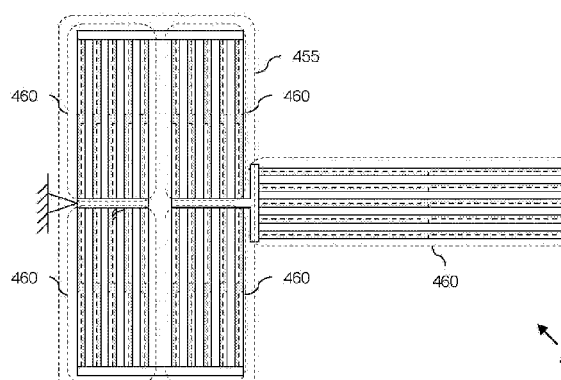
FIGS. 10 and 11 are top views of at least a portion of one embodiment of apparatus according to aspects of the present disclosure.

Referring to FIG. 10, illustrated is a top view of at least a portion of one embodiment of an apparatus 450 according to aspects of the present disclosure. As with the apparatus 400 shown in FIGS. 8 and 9, the apparatus 450 also represents an environment in which the apparatus 300 and/or 360 described above may be implemented. For example, the apparatus 450 includes actuators 460, where one or more of the actuators 460 may be substantially similar to the apparatus 300 shown in FIG. 6 and/or the apparatus 360 shown in FIG. 7.

Figure 11:
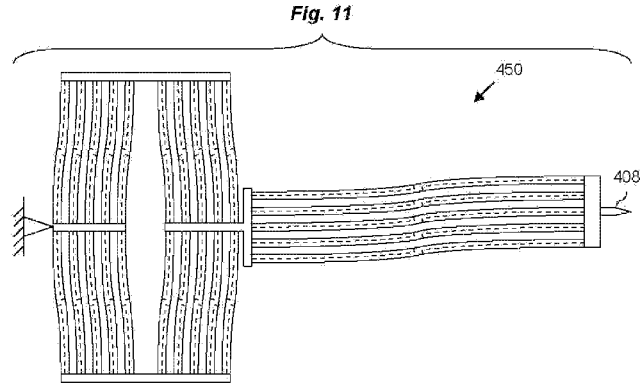

Four of the actuators 460 form a single DOF actuator 455 which may be substantially similar to the apparatus 400 shown in FIGS. 8 and 9. An additional actuator 460 couples the end effector 408 to the actuator 455. The actuator 460 is also configured as a single DOF actuator by which the end effector 408 may be positioned in an additional direction. Thus, as shown in FIG. 11, the apparatus 450 may operate as a two-DOF actuator, where the actuator 455 positions the actuator 460 (and, hence, the end effector 408) in a first direction, and the actuator 460 also positions the end effector 408 in a second direction. The first and second directions may be substantially parallel, although other embodiments are also within the scope of the present disclosure.

Figure 12:
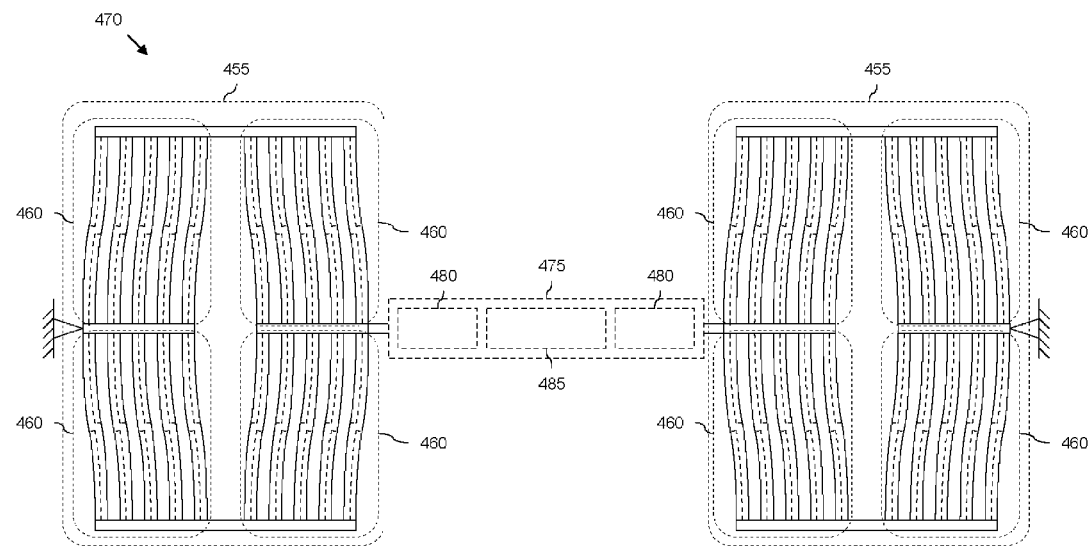
FIG. 12 is a top view of at least a portion of one embodiment of apparatus according to aspects of the present disclosure.

Referring to FIG. 12, illustrated is a top view of at least a portion of one embodiment of an apparatus 470 according to aspects of the present disclosure. As with the apparatus 400 shown in FIGS. 8 and 9, and the apparatus 450 shown in FIGS. 10 and 11, the apparatus 470 also represents an environment in which the apparatus 300 and/or 360 described above may be implemented. For example, the apparatus 470 includes actuators 460 which may be substantially similar to the apparatus 300 shown in FIG. 6 and/or the apparatus 360 shown in FIG. 7, including when configured as a one-DOF actuator 455 as shown in FIGS. 10 and 11.

In the illustrated embodiment, the apparatus 470 includes mirror-image, one-DOF actuators 455, which may cooperate as a one-DOF actuator operable to position a payload 475 in a first direction. The payload 475 may include one or more of the actuators described above, or combinations thereof, to provide positioning of an end-effector or other payload or feature in additional directions. For example, the payload 475 may include first and second actuators 480 configured to cooperate as an additional one-DOF actuator operable to position an end effector in a second direction, and a third actuator 485 configured as yet another one-DOF actuator operable to position the end effector in a third direction, where the first, second and third directions may be mutually orthogonal.

The actuators 480 and 485 are depicted schematically in FIG. 12 because there are myriad embodiments of such actuators within the scope of the present disclosure. For example, one or more of the actuators 480 and 485 may be substantially similar to the actuator 120 shown in FIGS. 1, 4 and 5, the actuator 200 shown in FIG. 2, the actuator 250 and/or actuator members 255 shown in FIG. 3, the apparatus 300 shown in FIG. 6, the apparatus 360 shown in FIG. 7, the apparatus 400 shown in FIGS. 8 and 9, the actuator 455 and/or the apparatus 450 shown in FIGS. 10 and 11, and/or combinations thereof, among others.

The embodiment depicted in FIG. 12 demonstrates, among other aspects, that the apparatus, actuators and actuator members illustrated herein and the myriad others within the scope of the present disclosure may be combined in series to form multi-DOF positioning and/or manipulation apparatus. However, in some embodiments, the thermal energy employed to operate one or more actuators within such multi-DOF apparatus may inadvertently skew the position of other actuators within the apparatus. For example, in a multi-DOF actuator including a first DOF actuator in close proximity with a second DOF actuator, the increased operating temperature of the first DOF actuator may result in the conduction and/or radiation of thermal energy towards the second DOF actuator. This escaping thermal energy may cause an undesired deflection/actuation of the second DOF actuator, depending on the proximity and other aspects of the first and second DOF actuators.

However, the inadvertent actuation may be mitigated where cooperating pairs of actuators are employed for a particular DOF. For example, if operation of the actuator 485 of FIG. 12 is accompanied by the above-described escape of thermal energy, the escaping thermal energy will generally radiate away from the actuator 485 at substantially the same rate in all directions, and/or be conducted away from the actuator 485 at substantially the same rate along all thermally conductive paths (assuming the paths have substantially similar thermal resistance). Consequently, the thermal energy escaping from the actuator 485 during its operation will be experience substantially equally at each of the actuators 460. Therefore, the actuators 460 may be configured to deflect in opposite directions but with substantially similar magnitude when exposed to substantially similar amounts of thermal energy.

Consequently, the thermal energy escaping from operation of the actuator 485 may urge one of the actuators 460 to deflect in a first direction, but may also urge the other actuator 460 to deflect in a second, opposite direction by substantially the same amount. Thus, the inadvertent deflection of each of the actuators 460 may offset one another, such that the actuators 460 may be thermally-decoupled from the actuator 485. That is, the apparatus 470 may be configured such that the thermal energy supplied to actuate the apparatus 470 in a first DOF may not cause an inadvertent actuation in a second DOF, or each actuator (460, 480, or 485) operable for actuation in a first DOF may be thermally-decoupled from each actuator operable for actuation in a second DOF.

Figure 13:
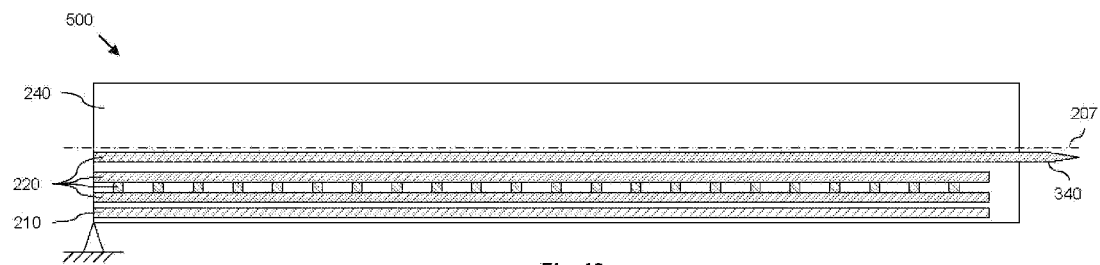
FIGS. 13-15 are sectional and side views of at least a portion of one embodiment of apparatus according to aspects of the present disclosure.
Figure 14:
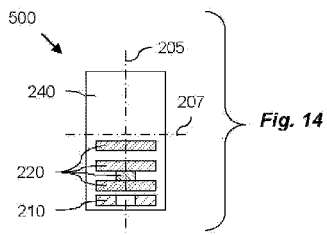

Referring to FIGS. 13 and 14 collectively, illustrated are sectional views of at least a portion of an embodiment of the actuator 120 shown in FIG. 1, herein designated by the reference numeral 500. As with the actuator 120 shown in FIG. 1, the actuator 500 includes a piezoresistive portion 210 and conductive members 220, among other possible features, which may be substantially similar in composition, manufacture and/or otherwise to corresponding features of the actuator 120 described above. Although not depicted in FIGS. 13 and 14, the actuator 500 may also include one or more piezoresistive portions as in embodiments described above, where such piezoresistive portions may be employed as heating elements and/or to monitor deflection of the actuator 500.

Figure 15:
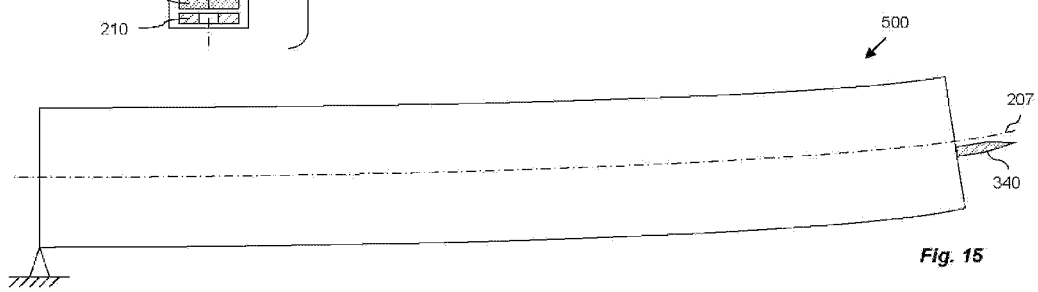

In the embodiment of FIGS. 13 and 14, the conductive members 220 are primarily located on one side of the horizontal midplane 207. Consequently, as shown in FIG. 15, the actuator 500 is configured to deflect upwards, or in a direction that is opposite the offset of conductive members 220 relative to the horizontal midplane 207. In similar embodiments (as with those described above), the actuator 500 may also include one or more conductive members 220 located above the horizontal midplane 207, although to a lesser degree than the conductive members 220 located below the midplane 207, such that expansion of the conductive members 220 throughout the actuator 500 when exposed to increased temperatures may still accomplish the upwards bending configuration depicted in FIG. 15. Of course, in other embodiments, this concept may also be employed to configured an actuator for deflection in an opposite, downward deflection.

FIGS. 13-15 also depict one of the conductive members 220 extending through the entire length of the actuator 500 to the end effector 340. In other embodiments, more than one of the conductive members 220 may provide such path through the actuator 500 to the end effector. FIGS. 13-15 also depict the end effector 340 as being integral to the conductive member 220. However, the end effector 340 may alternatively be a discrete component coupled directly or indirectly to the one or more conductive members 220 providing an electrical path through the actuator 500.

FIGS. 13 and 14 also depict that the piezoresistive portion 210 may extend along a substantial length of the actuator 500. As described above, the piezoresistive portion 210 may be operable as a heating element to control the temperature of the conductive members 220 (and/or a greater portion of the actuator 500), thereby controlling the actuation of the actuator 500. However, as will be explained below, the piezoresistive portion 210 may alternatively or additionally be employed as part of a sensing function which may be employed to monitor the orientation of the actuator 500.

It should also be pointed out that the actuator 500, as well as others described herein or otherwise within the scope of the present disclosure, may have an initial, neutral orientation that varies from the as-built configuration. That is, internal stresses which, for example, may build up during manufacture may cause an initial deflection of the actuator 500 upon release from any underlying substrate. This initial deflection may be in any one or more directions, depending on the particular placement and materials of the conductive members and other features of the actuator. Moreover, in some embodiments, the neutral or "at-rest" orientation of an actuator described herein may be tempered to achieve a desired deflection when the actuator is not being operated. For example, the actuator may be heated (with its internal heating elements or otherwise) to sufficient degree that the actuator deflects beyond its elastic range of motion, thereby causing plastic yielding. Consequently, when the actuator is allowed to cool, the orientation to which it may return may not be the same as its initial, released orientation. Thus, some embodiments of actuators manufactured according to aspects of the present disclosure may experience an initial deflection upon being released from its substrate, another deflection to reorient its released or neutral orientation, and yet another deflections during operation.

Figure 16:
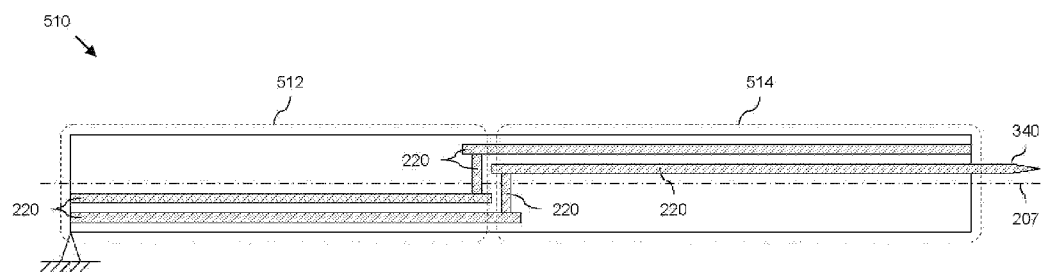
FIGS. 16 and 17 are side views of at least a portion of one embodiment of apparatus according to aspects of the present disclosure.

Referring to FIG. 16, illustrated is a sectional view of at least a portion of another embodiment of the actuator 500 shown in FIGS. 13-15, herein designated by the reference numeral 510. As with the actuator 500 shown in FIGS. 13-15, the actuator 510 includes conductive members 220, among other possible features, which may be substantially similar in composition, manufacture and/or otherwise to corresponding features of the actuator 120 described above. Although not depicted in FIG. 16, the actuator 510 may also include one or more piezoresistive portions as in embodiments described above, where such piezoresistive portions may be employed as heating elements and/or to monitor deflection of the actuator 510.

In the embodiment of FIG. 16, the conductive members 220 are primarily located on one side of the horizontal midplane 207 within a first region 512, and are primarily located on the opposite side of the horizontal midplane 207 within a second region 514. Additional conductive members 220 may interconnect those in the first region 512 with others in the second region 514. However, as a result of the concentration of conductive members 220 below the midplane 207 in the first region 512 of the actuator 510, the first region 512 is configured to deflect upwards, or in a direction that is opposite the offset of conductive members 220 relative to the horizontal midplane 207. Moreover, as a result of the concentration of conductive members 220 above the midplane 207 in the second region 514 of the actuator 510, the second region 514 is configured to deflect in a direction that is substantially opposite the direction of deflection of the first region 512.

In one embodiment, the lateral and/or angular displacement by which each of the first and second regions 512, 514 are configured to deflect may be substantially similar or otherwise correspond such that, for example, ends 516 of the actuator 510 remain substantially parallel. Similarly, the actuator 510 may be configured such that the end effector 340 remains substantially parallel to its initial or other predetermined orientation, such as where the actuator 510 is operable to translate end effector 340 without substantially affecting its angular orientation. However, in other embodiments, the actuator 510 may be configured to drive both the position and angular orientation of the end effector 340.

Figure 17:
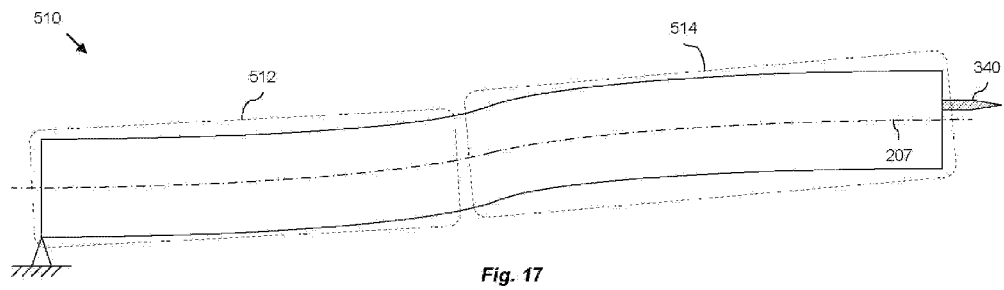
Figure 18:
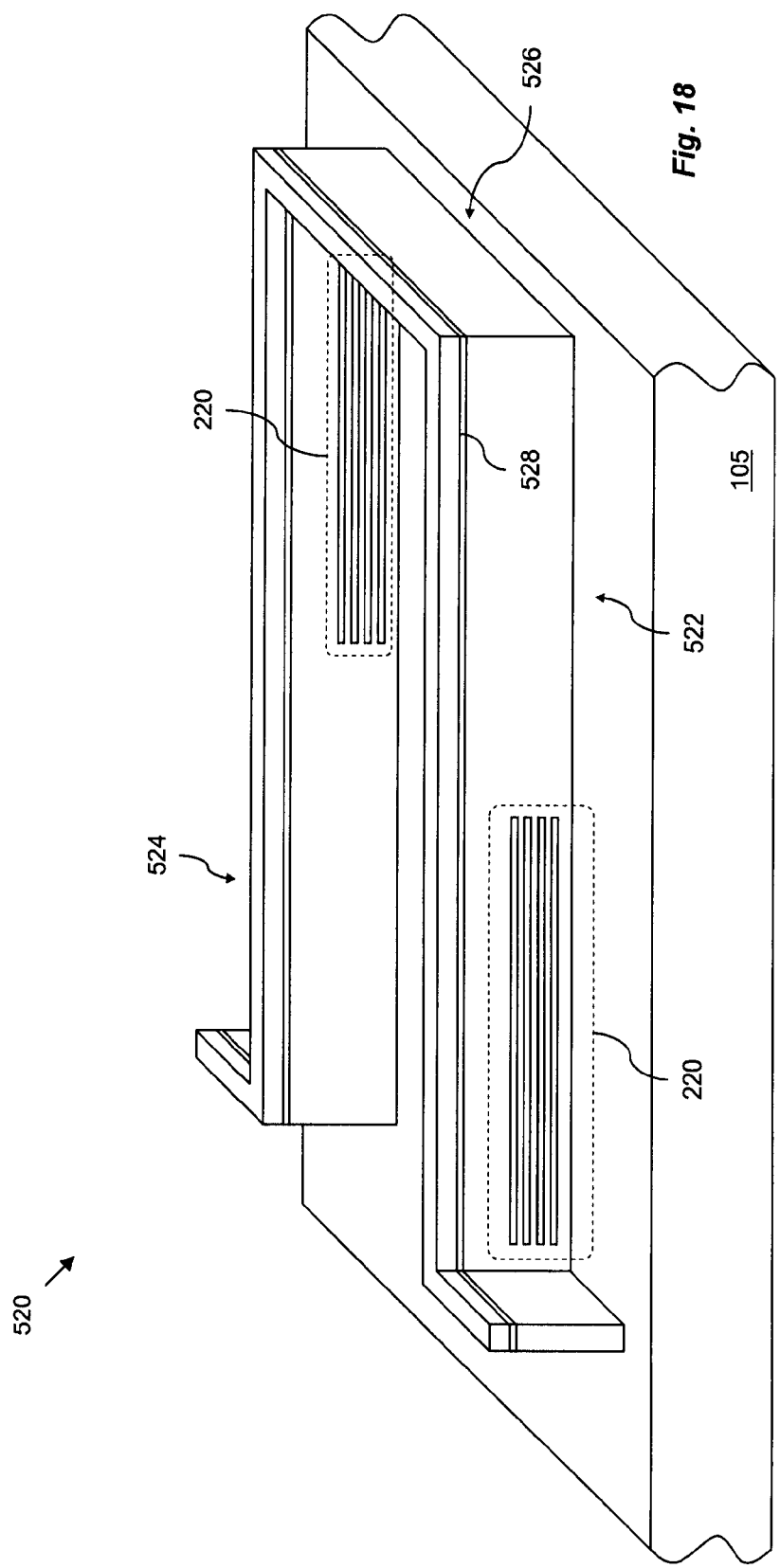
FIGS. 18 and 19 are perspective views of at least a portion of one embodiment of apparatus according to aspects of the present disclosure.

Referring to FIG. 18, illustrated is a perspective view of at least a portion of another embodiment of an actuator 520 according to aspects of the present disclosure. As with the actuator 500 shown in FIGS. 13-15 and the actuator 510 shown in FIGS. 16 and 17, the actuator 520 is operable for positioning an end effector or other payload in a direction that is substantially perpendicular to an underlying substrate 105.

The actuator 520 includes first and second actuator members 522, 524 which may be directly coupled together or, as in the embodiment of FIG. 18, may be coupled by an additional member or segment 526. The actuator members 522, 524 and joining member 526 may also be integrally formed. One or more conductive lines 528 may extend through the actuator 520, such as for passing control and/or data signals, where each conductive line 528 may include one or more segments and/or vias each substantially similar to the conductive members 220 described above. Although not depicted in FIG. 18, the actuator 520 may also include one or more piezoresistive portions as in embodiments described above, where such piezoresistive portions may be employed as heating elements and/or to monitor deflection of the actuator 520.

Figure 19:
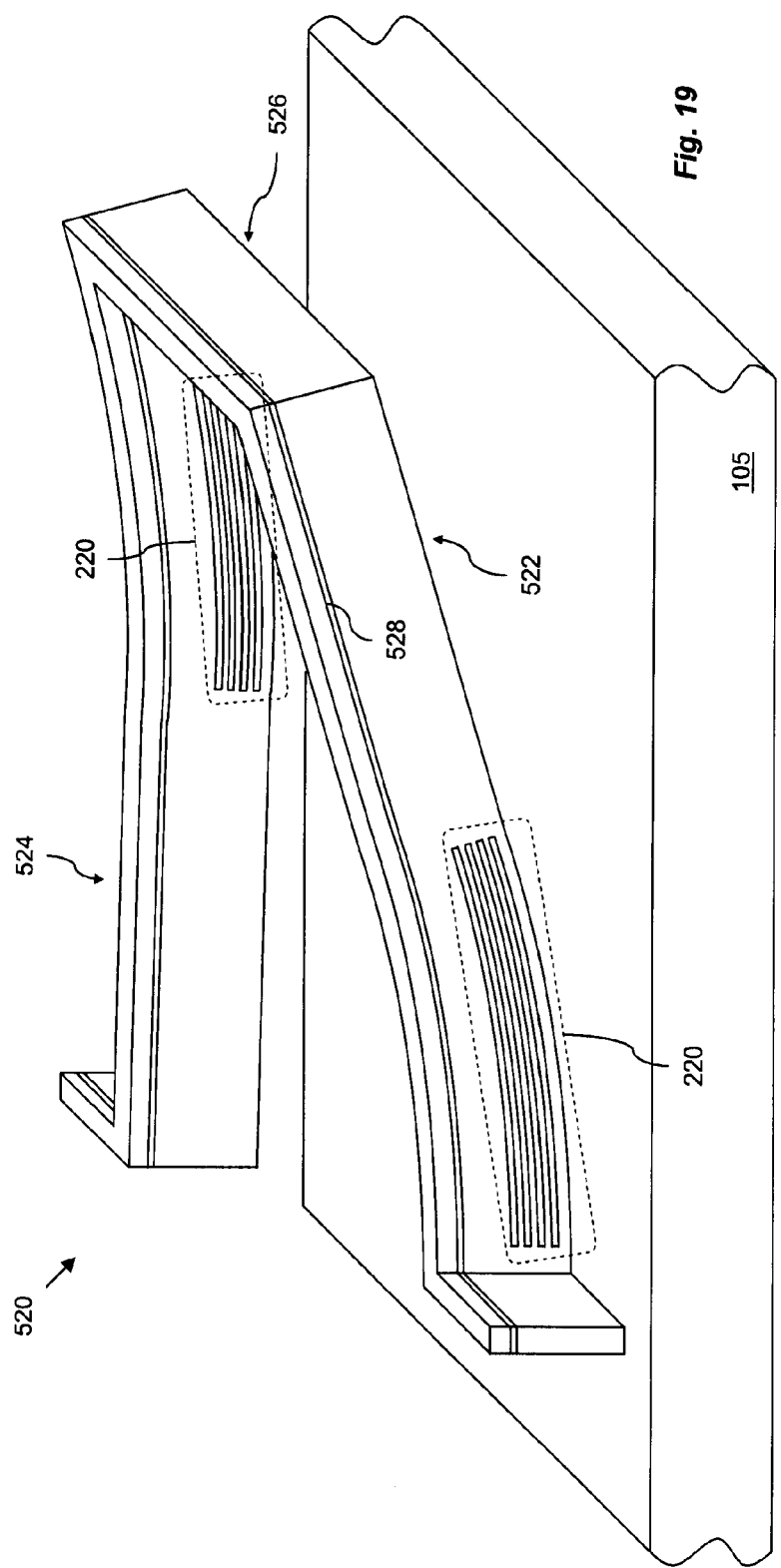

Each of the first and second actuator members 522, 524 include a plurality of conductive members 220 configured to produce a deflection away from the substrate 105 at elevated temperatures, such as in the deflected orientation of the actuator 520 shown in FIG. 19. For example, each actuator member 522, 524 may have a higher concentration of conductive members 220 in a region that is proximate the substrate 105 and a lower concentration of conductive members 220 in a region that is distal from the substrate 105. In one embodiment, an upper half of each actuator member 522, 524, relative to the substrate 105, may be substantially void of conductive members 220.

Figure 20:
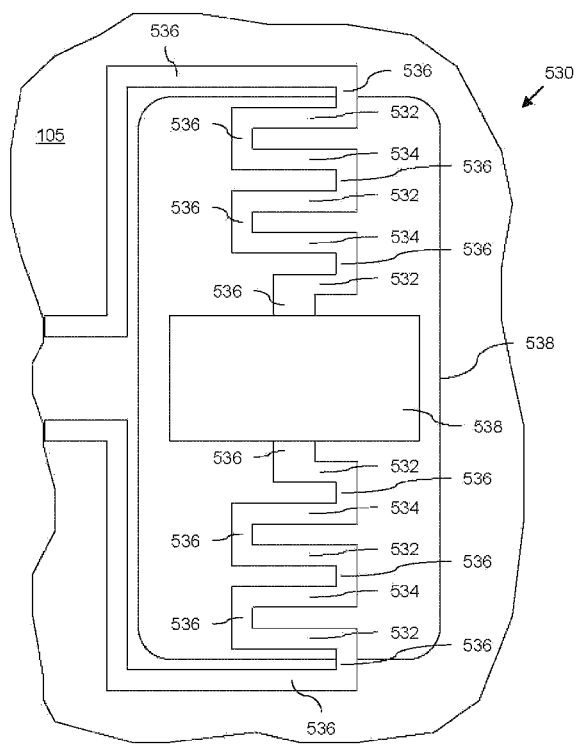
FIGS. 20 and 21 are top and side views of at least a portion of one embodiment of apparatus according to aspects of the present disclosure.

Referring to FIG. 20, illustrated is a top view of at least a portion of another embodiment of the apparatus 520 shown in FIGS. 18 and 19, herein designated by the reference numeral 530. The apparatus 530 includes a first group of actuator members 532 which may each be substantially similar to either of the actuator members 522, 524 shown in FIGS. 18 and 19. For example, each of the actuator members 532 may be configured to deflect away from the substrate 105 at elevated temperatures. Although not depicted in FIG. 20, the apparatus 530 may also include one or more piezoresistive portions as in embodiments described above, where such piezoresistive portions may be employed as heating elements and/or to monitor deflection of the apparatus 530.

The apparatus 530 also includes a second group of actuator members 534 connected between ones of the actuator members 532, whether directly or by one or more static members 536. The actuator members 534 may each be substantially similar to either of the actuator members 522, 524 shown in FIGS. 18 and 19, except that the actuator members 534 are configured to deflect towards the substrate 105 at elevated temperatures. For example, where the actuator members 532 may include a higher concentration of conductive members in a region closer to the substrate 105, as with the configuration of conductive members 220 within the actuator members 522, 524 shown in FIGS. 18 and 19, the actuator members 534 may include a higher concentration of conductive members in a region that is distal from the substrate 105.

Figure 21:
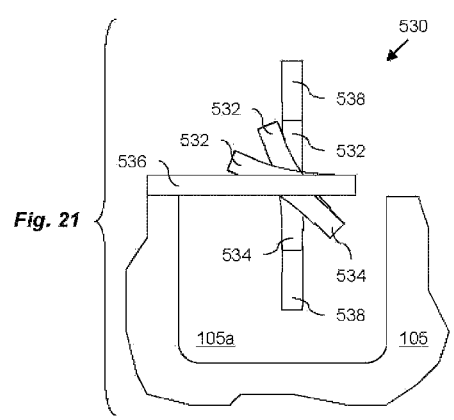

Consequently, as shown in the side view of the apparatus 530 depicted in FIG. 21, the actuator members 532, 534 may cooperate to rotate a payload 538, where the angular rotation of the payload 538 is dependent upon the temperature of the actuator members 532, 534 and/or the conductive members therein. As also shown in FIG. 21, the substrate 105 may include a recess 105a having dimensions at least great enough to prevent restricting movement of the actuator members 532, 534, the static members 536, and/or the payload 538.

Figure 22:
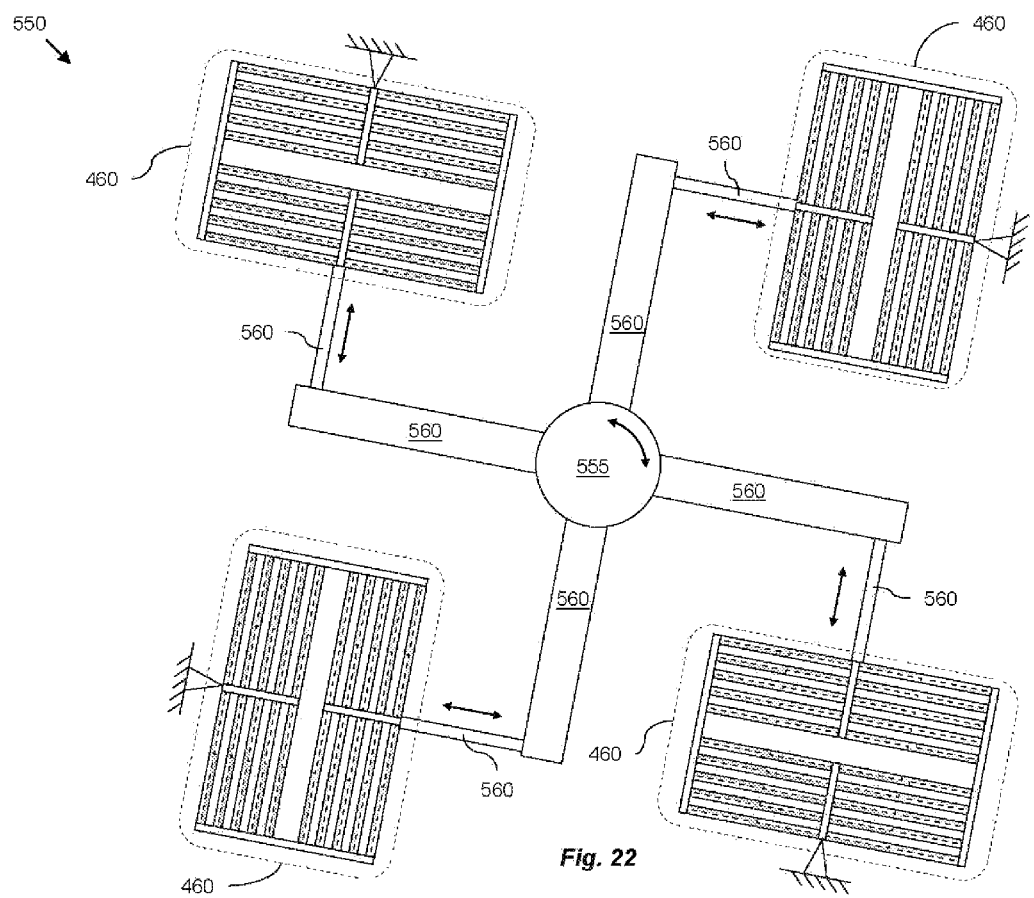
FIG. 22 is a top view of at least a portion of one embodiment of apparatus according to aspects of the present disclosure.

Referring to FIG. 22, illustrated is a top view of at least a portion of an embodiment of an apparatus 550 according to aspects of the present disclosure. As with the apparatus 400 shown in FIGS. 8 and 9 and the apparatus 450 shown in FIGS. 10 and 11, the apparatus 550 represents an environment in which the apparatus 300, 360 and/or others described above may be implemented. For example, the apparatus 550 includes actuators 460, where one or more of the actuators 460 may be substantially similar to the apparatus 300 shown in FIG. 6 and/or the apparatus 360 shown in FIG. 7.

The actuators 460 are each connected to a stage or payload 555, such as by one or more static members 560, such that actuations of the actuators 460 is operable to rotate the payload 555. Thus, the apparatus 550 may be a single DOF actuator, providing rotation of the payload 555 about a single axis. The apparatus 550 may also be combined with other single- or multi-DOF actuators and/or apparatus described herein or otherwise within the scope of the present disclosure. For example, the payload 555 may include a single- or multi-DOF actuator(s) which may be rotated by the apparatus 550.

Figure 23:
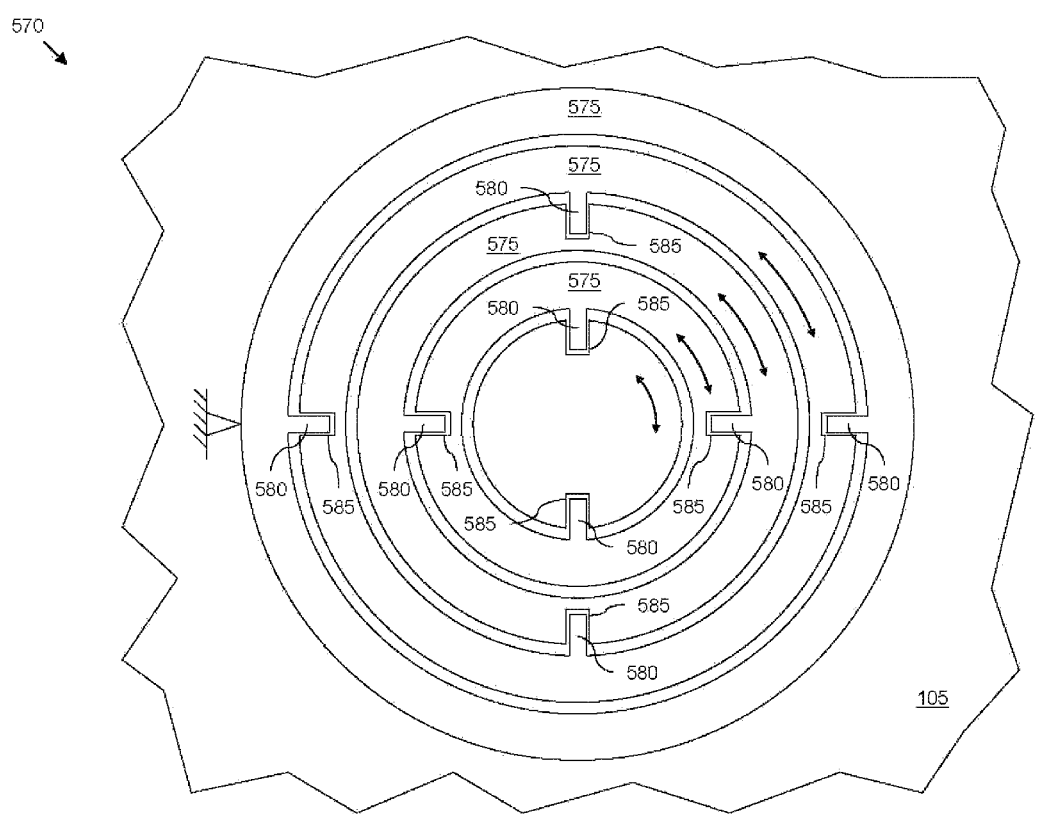
FIG. 23 is a top view of at least a portion of one embodiment of apparatus according to aspects of the present disclosure.

Referring to FIG. 23, illustrated is a top view of at least a portion of another embodiment of a single-DOF actuator apparatus, designated herein by the reference numeral 570, which is operable to rotate a payload 555 about a single axis. The apparatus 570 includes a series of concentric, ring-shaped members 575, each having at least one actuator member 580 extending radially inward. Each actuator member 580 may be substantially similar to the actuator 120 shown in FIG. 1, the actuator 200 shown in FIG. 2, the actuator 250 shown in FIG. 3, the apparatus 300 shown in FIG. 6, the apparatus 360 shown in FIG. 7, and/or the apparatus 400 shown in FIGS. 8 and 9, among others, or combinations thereof.

Several of the ring-shaped members 575 also include one or more recesses 585 each extending inward from an outer perimeter and configured to receive a corresponding actuator member 580 of a neighboring member 575. Each ring-shaped member 575 may include more than one actuator member 580 and/or recess 585. Moreover, in a similar embodiment, one or more of the recesses 585 may extend into an inner perimeter of the corresponding ring-shaped member 575 to receive one or more corresponding actuator members 580 that extend radially outward.

Each of the actuator members 580 is configured to deflect in a substantially tangential direction relative to its corresponding ring-shaped member 575. For example, the largest or outer ring-shaped member 575 may be positionally anchored, such that deflection of its actuator members 580 causes the adjacent ring-shaped member 575 to rotate. In this manner, each of the ring-shaped members 575 may be configured to cause rotation of each successively-smaller ring-shaped member 575. The payload 555 may include recesses 585 configured to receive corresponding actuator members 580 extending radially inward from the smallest ring-shaped member 575.

Figure 24:
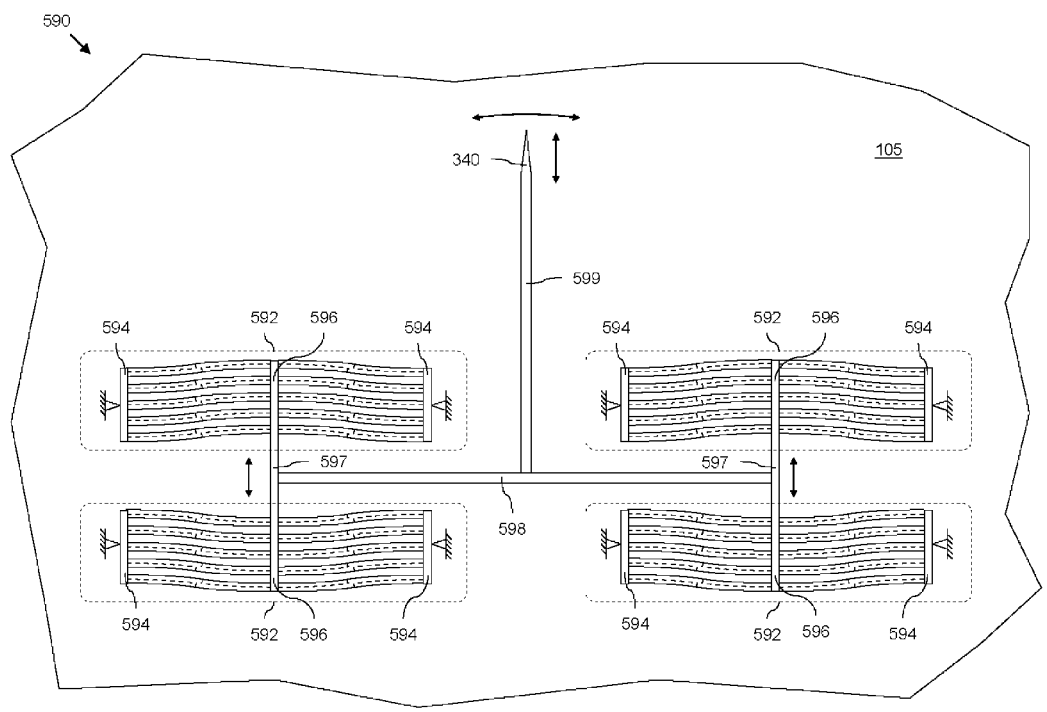
FIG. 24 is a top view of at least a portion of one embodiment of apparatus according to aspects of the present disclosure.

Referring to FIG. 24, illustrated is a schematic view of at least a portion of an embodiment of a two-DOF apparatus 590 according to aspects of the present disclosure. The apparatus 590 also represents an environment in which the apparatus 300, 360, 400, 450 and/or other described above may be implemented. For example, the apparatus 590 includes paired actuators 592 which are substantially similar to pairs of the actuators 410, 460 shown in FIGS. 8-11. However, the outside, distal ends of the paired actuators 460 shown in FIGS. 8-11 are coupled together. In contrast, the outside ends 594 of the paired actuators 592 in the apparatus 590 are not coupled to one another, although the ends 594 may be anchored to an underlying substrate 105. Moreover, the inside, adjacent ends 596 of the paired actuators 592 are also joined, connected or coupled to the inside ends 596 of a corresponding pair of actuators 592 by a corresponding connection member 597. A tie member 598 extends between a central portion of each of the connection members 597, and an extension 599 spans between an end effector 340 and the tie member.

The paired actuators 592 collectively form a two-DOF actuator when tied together as in the embodiment illustrated in FIG. 24. That is, the actuators 592 are configured to translate the connection members 597 in a back and forth motion relative to the substrate 105, such that the end effector 340 may also be translated in the same back and forth motion. Moreover, the actuators 592 may be configured to translate each of the connection members 597 independently, such that the actuators 592 may also translate each connection member 597 relative to the other connection member 597. Consequently, the tie member 598, the extension 599 and the end effector 340 may also be rotated relative to the substrate.

Figure 25:
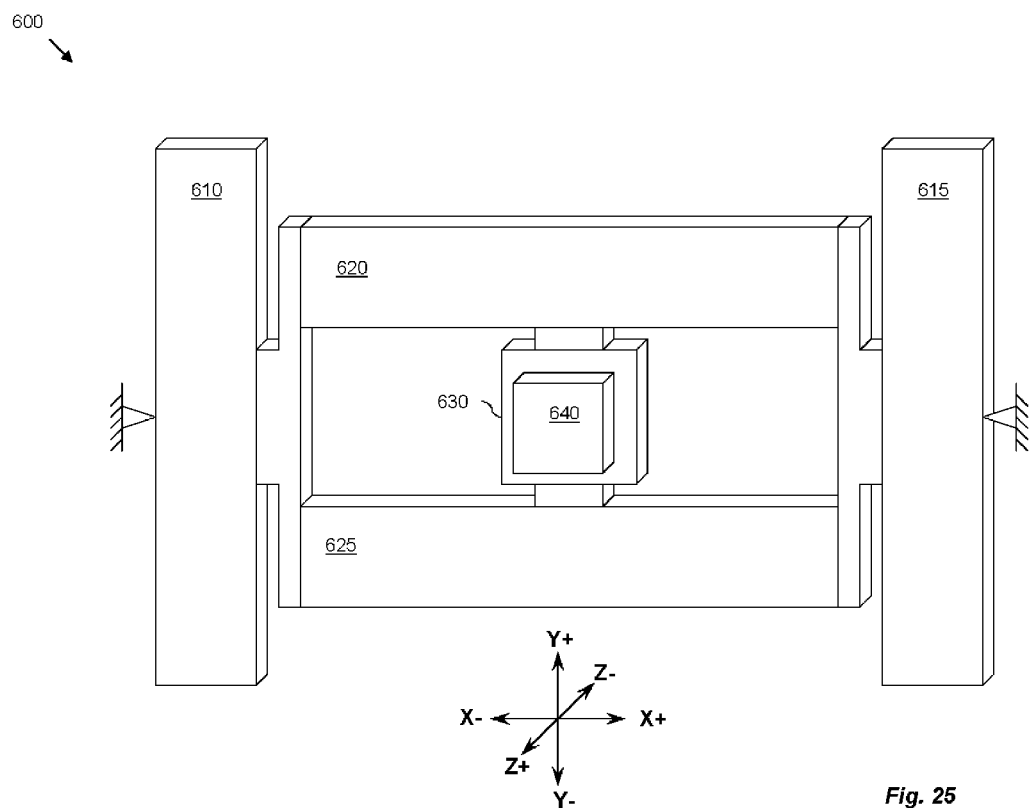
FIG. 25 is a perspective view of at least a portion of one embodiment of apparatus according to aspects of the present disclosure.

Referring to FIG. 25, illustrated is a schematic view of at least a portion of one embodiment of an apparatus 600 according to aspects of the present disclosure. The apparatus 470 represents an environment in which the apparatus 100, 200, 250, 300, 360, 400, 450, 500, 510, 520, 530, 550, 570 and/or 590 described above, as well as others within the scope of the present disclosure, may be implemented. For example, the apparatus 600 includes X direction actuators 610, 615, Y direction actuators 620, 625, and at least one Z direction actuator 630, thereby providing three-DOF (X, Y and Z) actuation. One or more of the actuators 610, 620 and 630 may be substantially similar to one or more of the apparatus 100, 200, 250, 300, 360, 400, 450, 500, 510, 520, 530, 550, 570 and/or 590 described above, among others.

The X direction actuators 610, 615 may each independently provide positioning in both X+ and X− directions. For example, the X direction actuators 610, 615 may each be substantially similar to the apparatus 400 shown in FIGS. 8 and 9. Alternatively, the X direction actuators 610, 615 may be configured to cooperate to provide positioning in both X+ and X− directions, although neither actuator 610, 615 may be configured to independently provide such positioning.

For example, the X direction actuator 610 may provide positioning in one of X+ and X− directions, and the X direction actuator 615 may provide positioning in the other of X+ and X− directions. In another embodiment, one of the X direction actuators 610, 615 may be configured to provide positioning in both X+ and X− directions, but only on the X+ side of their neutral positions (e.g., X≧0) or some other predetermined position, where the other of the X direction actuators 610, 615 may be configured to provide positioning in both X+ and X− directions on only the X− side of the neutral or predetermined position. For example, in one embodiment in which the X direction actuators 610, 615 are configured to cooperate to provide both X+ and X− positioning on both sides of their neutral positions, but are not configured to each independently provide such positioning, each of the X direction actuators 610, 615 may be substantially similar to the actuators 592 shown in FIG. 24.

The Y direction actuators 620, 625 may be substantially similar to the X direction actuators 610, 615. For example, the Y direction actuators 620, 625 may be configured to independently provide positioning in both Y+ and Y− directions, or they may be configured to provide such positioning only via cooperation. The Z direction actuator 630 may be substantially similar to the apparatus 500 shown in FIGS. 13-15, the apparatus 510 shown in FIGS. 16 and 17, and/or the apparatus 520 shown in FIGS. 18 and 19. Alternatively, the actuator 630 may be configured to provide rotational positioning about the X, Y or Z axis, instead of lateral positioning in the Z direction. For example, the actuator 630 may be substantially similar to the apparatus 530 shown in FIGS. 20 and 21, the apparatus 550 shown in FIG. 22, the apparatus 570 shown in FIG. 23, and/or the apparatus 590 shown in FIG. 24, among others. Alternatively, or additionally, one or more of the other actuators 610, 615, 620, 625 may be similarly configured to provide rotational positioning instead of lateral positioning.

The embodiment depicted in FIG. 25 thus demonstrates, among other aspects, that the apparatus, actuators and actuator members illustrated herein, and the myriad others within the scope of the present disclosure, may be combined in series and/or parallel to form multi-DOF positioning and/or manipulation apparatus. Moreover, as described above, two or more (or all) of the actuators in many such embodiments may be thermally decoupled, such that the thermal energy employed to actuate one or more of the actuators does not affect the precision of other actuators.

In addition, the actuators employed in a multi-DOF apparatus according to aspects of the present disclosure may also be directionally decoupled. That is, the positioning of an end effector or other payload in a first DOF may not affect the position of the payload in any other DOF. For example, in the embodiment depicted in FIG. 25, the payload 640 may be positioned in the X direction by the X direction actuators 610, 615 with little or no effect on the position of the payload 640 in the Y or Z directions. Thus, the Y direction actuators 620, 625 and the Z direction actuator 630 may each be directionally decoupled from the X direction actuators 610, 615. Similarly, the payload 640 may be positioned in the Y direction by the Y direction actuators 620, 625 with little or no effect on the position of the payload 640 in the X and Z directions, and/or the payload 640 may be positioned in the Z direction by the Z direction actuator 630 with little or no effect on the position of the payload 640 in the X and Y directions. Thus, operation of the apparatus 600 may be directionally decoupled, such that the position of the payload 640 in any one direction may not be effected by positioning the payload 640 in any other direction.

Figure 26:
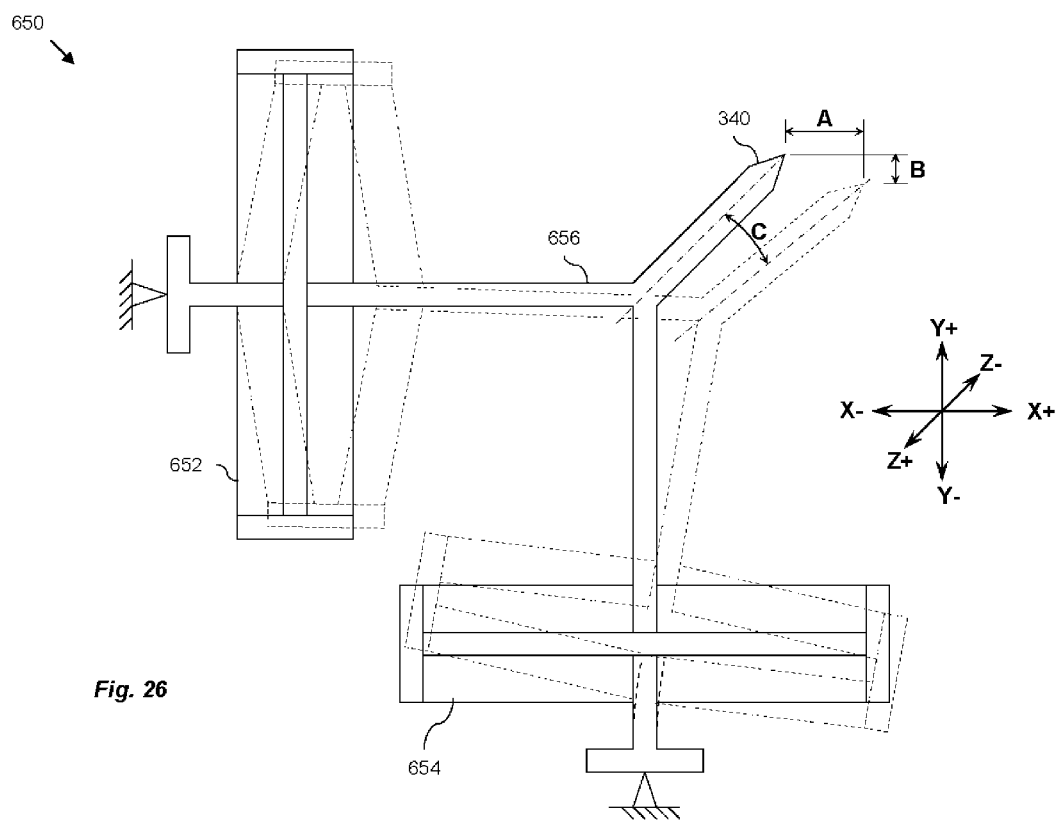
FIG. 26 is a top view of at least a portion of one embodiment of apparatus according to aspects of the present disclosure.

In other embodiments, one or more DOF may not be directionally decoupled, such that precisely positioning the payload 640 in one DOF may requires operation of actuators corresponding to two or more DOF. For example, one such embodiment is depicted in FIG. 26, which illustrates a top view of an apparatus 650 according to aspects of the present disclosure. The apparatus 650 includes X direction actuator 652 and Y direction actuator 654, each of which may be substantially similar to the apparatus 400 shown in FIGS. 8 and 9, among others described herein or otherwise within the scope of the present disclosure.

The actuators 652, 654 are configured to cooperate in the positioning of end effector 340 in X and Y directions, such as where the end effector 340 may be coupled to each of the actuators 652, 654 by a connection member 656 and/or other means. A neutral or at-rest position of the end effector 340 is depicted in FIG. 26 by solid lines, and an actuated position is depicted by dashed lines. The intended actuation depicted in FIG. 26 is translation in the X+ direction by a distance "A." However, because the actuators 652, 654 are not directionally decoupled, the translation by distance A in the X+ direction causes an additional translation of the end effector 340 in the Y− direction by a distance "B," as well as rotation of the end effector 340 about the Z-axis by an angle "C." Consequently, when a desired operation is intended to be limited to actuation in the X+ direction, such operation may require simultaneous actuation in the Y+ direction to ensure that the actual translation of the end effector 340 takes into account the directionally coupled configuration of the actuators 652, 654.

Referring to FIGS. 27a-27f, collectively, illustrated are schematic diagrams of various embodiments of apparatus 700a-f according to aspects of the present disclosure. Aspects of the apparatus 700a-f are similar to the apparatus 450 shown in FIGS. 10 and 11, the apparatus 470 shown in FIG. 12, and/or the apparatus 600 shown in FIG. 25, among others within the scope of the present disclosure.

For example, each of the apparatus 700a-f includes two or more actuators 710a-f, and one or more of the actuators 710a-f may be substantially similar to one or more of the apparatus 100 or the actuator 120 shown in FIG. 1, the actuator 200 shown in FIG. 2, and/or the actuator 250 shown in FIG. 3, among others. One or more of the actuators 710a-f may additionally or alternatively be substantially similar to one or more of the apparatus 300 shown in FIGS. 6 and 7, the apparatus 400 shown in FIGS. 8 and 9, and/or the apparatus 450 shown in FIGS. 10 and 11. One or more of the actuators 710a-f may additionally or alternatively be substantially similar to one or more of the apparatus 470 shown in FIG. 12, the apparatus 500 shown in FIGS. 13-15, and/or the apparatus 510 shown in FIGS. 16 and 17. One or more of the actuators 710a-f may additionally or alternatively be substantially similar to one or more of the apparatus 520 shown in FIGS. 18 and 19, the apparatus 530 shown in FIGS. 20 and 21, and/or the apparatus 550 shown in FIG. 22. One or more of the actuators 710*a-f* may additionally or alternatively be substantially similar to one or more of the apparatus 570 shown in FIG. 23, the apparatus 590 shown in FIG. 24, and/or the apparatus 600 shown in FIG. 25.

Figure 27:
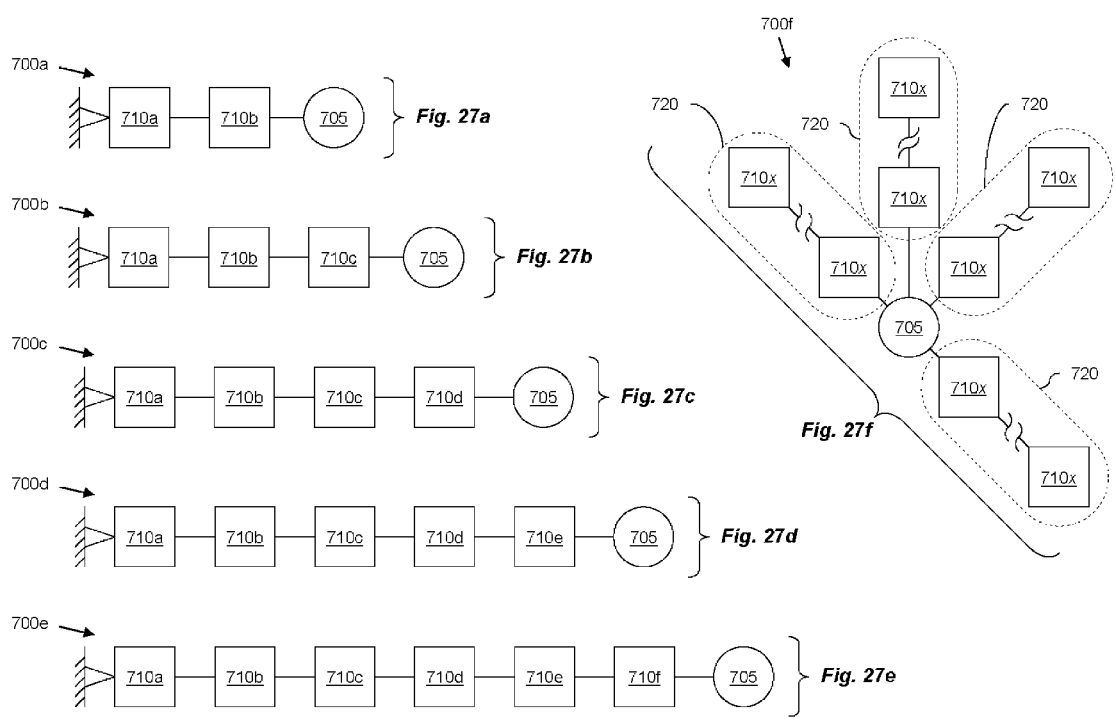
FIGS. 27a-f are schematic views each of at least a portion of various embodiments of apparatus according to aspects of the present disclosure.

The apparatus 700*a* shown in FIG. 27*a* is operable to position one or more end effectors and/or other payload 705 in at least two DOF. For example, the actuator 710*a* may be an X direction actuator configured to position payload 705 and the actuator 710*b* along a first axis, and the actuator 710*b* may be a Y direction actuator configured to position payload 705 along a second axis, wherein the first and second axes may be substantially perpendicular. In another embodiment, the actuator 710*a* may be configured to rotate payload 705 and the actuator 710*b* about the first axis, and/or the actuator 710*b* may be configured to rotate payload 705 about the second axis. In these and other embodiments, the apparatus 700*a* may be configured for thermally decoupled and/or directionally decoupled operation, as described above. For example, positioning and/or rotating payload 705 with respect to a first DOF may be thermally and/or directionally decoupled from positioning and/or rotating the payload 705 with respect to a second DOF.

The apparatus 700*b* shown in FIG. 27*b* is operable to position payload 705 in at least three DOF. For example, the actuator 710*a* may be an X direction actuator configured to position payload 705 and the actuators 710*b*, 710*c* along a first axis, the actuator 710*b* may be a Y direction actuator configured to position payload 705 and the actuator 710*c* along a second axis, and the actuator 710*c* may be a Z direction actuator configured to position payload 705 along a third axis, wherein two or more of the first, second and third axes may substantially be mutually perpendicular. In another embodiment, the actuator 710*a* may be configured to rotate payload 705 and the actuators 710*b*, 710*c* about the first axis, the actuator 710*b* may be configured to rotate payload 705 and the actuator 710*c* about the second axis, and/or the actuator 710*c* may be configured to rotate payload 705 about the third axis. In another embodiment, the actuator 710*a* may be an X direction actuator, the actuator 710*b* may be a Y direction actuator, and the actuator 710*c* may be configured to rotate payload 705 about the X axis, the Y axis, and/or another axis, including an axis that is substantially perpendicular to each of the X and Y axes (e.g., a Z axis). The apparatus 700*b* may also be configured for thermally decoupled and/or directionally decoupled operation, as described above. For example, positioning and/or rotating payload 705 with respect to a first DOF may be thermally and/or directionally decoupled from positioning and/or rotating the payload 705 with respect to a second DOF and/or a third DOF.

The apparatus 700*c* shown in FIG. 27*c* is operable to position payload 705 in at least four DOF. For example, the actuator 710*a* may be an X direction actuator configured to position payload 705 and the actuators 710*b-d* along a first axis, the actuator 710*b* may be a Y direction actuator configured to position payload 705 and the actuators 710*c*, 710*d* along a second axis, the actuator 710*c* may be a Z direction actuator configured to position payload 705 and the actuator 710*d* along a third axis, and the actuator 710*d* may be a rotational position actuator configured to rotate payload 705 about a fourth axis. In such an embodiment, two or more of the first, second and third axes may substantially be mutually perpendicular. The fourth axis may also or alternatively be substantially coincident or parallel with one of the first, second and third axes.

In another embodiment of the apparatus 700*c*, the actuator 710*a* may be configured to rotate payload 705 and the actuators 710*b-d* about the first axis, the actuator 710*b* may be configured to rotate payload 705 and the actuators 710*c*, 710*d* about the second axis, the actuator 710*c* may be configured to rotate payload 705 and the actuator 710*d* about the third axis, and/or the actuator 710*d* may be configured to position payload 705 along one of the first, second and third axes. In another embodiment, the actuator 710*a* may be an X direction actuator, the actuator 710*b* may be a Y direction actuator, the actuator 710*c* may be configured to rotate payload 705 about the X axis, and the actuator 710*d* may be configured to rotate payload 705 about the Y axis. The apparatus 700*c* may also be configured for thermally decoupled and/or directionally decoupled operation, as described above. For example, positioning and/or rotating payload 705 with respect to a first DOF may be thermally and/or directionally decoupled from positioning and/or rotating the payload 705 with respect to one or more other DOF.

The apparatus 700*d* shown in FIG. 27*d* is operable to position payload 705 in at least five DOF. For example, each of the actuators 710*a-e* may be a lateral position actuator configured to position payload 705 along a corresponding axis. All or several of the actuators 710*a-e* may be connected or otherwise function in series, such that the actuator 710*a* may position the actuators 710*b-e* and payload 705 along a corresponding axis, the actuator 710*b* may position the actuators 710*c-e* and payload 705 along a corresponding axis, the actuator 710*c* may position the actuators 710*d*, 710*e* and payload 705 along a corresponding axis, and/or the actuator 710*d* may position the actuator 710*e* and payload 705 along a corresponding axis.

One or more of the actuators 710*a-e* may additionally or alternatively be a rotational position actuator configured to rotate payload 705 about a corresponding axis. Thus, in embodiments in which all or several of the actuators 710*a-e* are connected or otherwise function in series, the actuator 710*a* may rotate the actuators 710*b-e* and payload 705 about a corresponding axis, the actuator 710*b* may rotate the actuators 710*c-e* and payload 705 about a corresponding axis, the actuator 710*c* may rotate the actuators 710*d*, 710*e* and payload 705 about a corresponding axis, and/or the actuator 710*d* may rotate the actuator 710*e* and payload 705 about a corresponding axis.

The axes along which the actuators 710*a-e* are configured to position payload 705, and/or the axes about which the actuators 710*a-e* are configured to rotate payload 705, may collectively be limited to two or three axes, which may substantially be mutually perpendicular. In one embodiment, such axes include first, second and third axes which each coincide or otherwise correspond to a major axis, plane, direction, vector and/or coordinate of a reference coordinate system and/or the coordinate system of equipment in which the apparatus 700*d* is installed or otherwise being employed.

The apparatus 700*e* shown in FIG. 27*e* may be substantially similar to the apparatus 700*d* shown in FIG. 27*d*, although the apparatus 700*e* is operable to position payload 705 in at least six DOF. For example, each of the actuators 710*a-f* may be a lateral position actuator configured to position payload 705 along a corresponding axis, and/or a rotational position actuator configured to rotate payload 705 about a corresponding axis. In one embodiment, the actuators 710*a-f* include at least three lateral position actuators each corresponding to a different one of three axes, and/or at least three rotational position actuators each corresponding to a different one of the three axes, where the three axes may substantially be mutually perpendicular. However, in other embodiments of the apparatus 700e, the actuators 710a-f may each be a lateral position actuator, the actuators 700a-f may each be a rotational position actuator, or the actuators 700a-f may include some other combination of lateral and rotational position actuators.

Two or more of the actuators 710a-f may be connected or otherwise function in series. For example, the actuator 710a may translate and/or rotate the actuators 710b-f and payload 705 relative to a first axis. The actuator 710b may translate and/or rotate the actuators 710c-f and payload 705 relative to the first axis or a second axis. The actuator 710c may translate and/or rotate the actuators 710d-f and payload 705 relative to one of the first or second axes or a third axis. The actuator 710d may translate and/or rotate the actuators 710e, 710f and payload 705 relative to one of the first-third axes or a fourth axis. The actuator 710e may translate and/or rotate the actuator 710f and payload 705 relative to one of the first-fourth axes or a fifth axis. The actuator 710f may translate and/or rotate payload 705 relative to one of the first-fifth axes or a sixth axis. In such an embodiment, two or more of the first-sixth axes may substantially be mutually perpendicular or coincident.

Referring to FIG. 27f, illustrated is a schematic diagram of another embodiment of the apparatus 700a-e shown in FIGS. 27a-e, herein designated by the reference numeral 700f. The apparatus 700f may be substantially similar to one or more of the apparatus 700a-e described above. For example, the apparatus 700f includes a number of actuators 710x which may each be substantially similar to one or more of the actuators 710a-f described above. The actuators 710x are arranged in a number of actuator groups 720 which may each be substantially similar to one or more of the apparatus 700a-e described above, at least to the extent that two or more actuators 710x may be connected in series or otherwise to position, rotate, manipulate or otherwise interact with payload 705 in two or more DOF. Each actuator group 720 may include one or more of the actuators 710a-f (indicated schematically as "710x"), possibly including multiple instances of one or more of the actuators 710a-f.

The groups 720 are configured to cooperate in the positioning or other manipulation of payload 705, in contrast to each being dedicated to position a distinct, corresponding payload, as may be the case for one or more embodiments of one or more of the apparatus 700a-e. For example, the actuator groups 720 may be configured to position or manipulate payload 705 in a substantially simultaneous manner. Such parallel operation may entail interaction with a single or common feature or area of payload 705 by two or more actuator groups 720. In one embodiment, such operation may entail interaction with different features or areas of payload 705, such as where one actuator group 720 may probe, position, rotate, manipulate or otherwise interact (collectively, "interact") with a feature, component, device, area or other aspect (collectively, "aspect") of payload 705, while another actuator group 720 may interact substantially simultaneously with the same or an additional aspect of payload 705.

For example, payload 705 may include an integrated circuit device, and one of the actuator groups 720 may interact with a first electrical contact on the integrated circuit device while another one of the actuator groups 720 interacts with a second electrical contact on the integrated circuit device. Payload 705 may also or alternatively include a MEMS, NEMS or other assembly, possibly including a heterogeneous assembly, such that one of the actuator groups 720 may grip, interface or otherwise interact with a first component of the assembly while another one of the actuator groups 720 may grip, interface or otherwise interact with a second component of the assembly, such as may be performed to assemble the first and second components.

The particular configuration of the actuators 710a-f of the apparatus 700a-f described above may vary among the many embodiments within the scope of the present disclosure, including within a particular embodiment of one of the apparatus 700a-f. For example, the actuators 710a-f may include at least three coarse position actuators each corresponding to one of three DOF, and/or at least three fine position actuators each corresponding to one of three DOF, possibly the same three DOF which correspond to the at least three coarse position actuators. The precision, total travel, and/or dimensions of such coarse position actuators may be substantially greater than such aspects of the fine position actuators. For example, the coarse position actuators may have a precision ranging between about 500 nm and about 10,000 nm and/or a total travel of about 100,000 nm, whereas the fine position actuators may have nanoscale precision, possibly ranging between about 10 nm and about 250 nm, and/or a total travel of about 500 nm. Of course, the precision and/or total travel of any particular one of the actuators 710a-f and/or apparatus 700a-f may vary otherwise within the scope of the present disclosure, including beyond these exemplary ranges, and may also vary relative to others of the actuators 710a-f employed in the myriad possible embodiments of the apparatus 700a-f.

Figure 28:
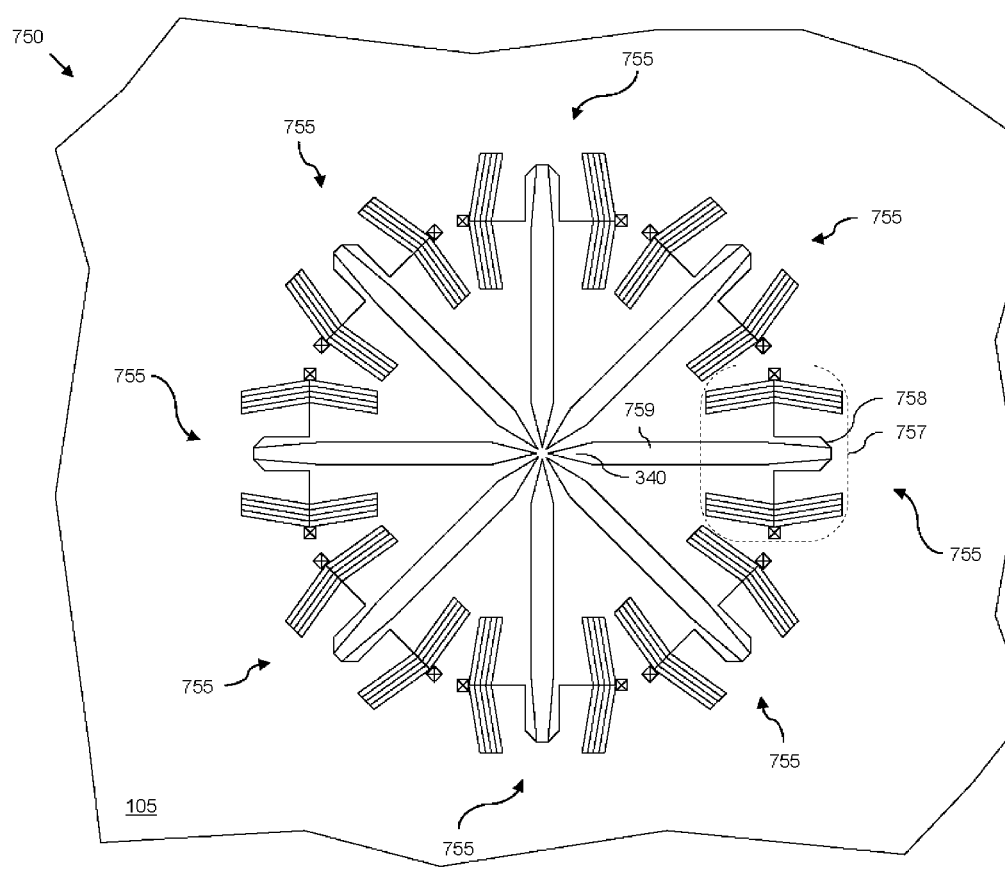
FIG. 28 is a top view of at least a portion of one embodiment of apparatus according to aspects of the present disclosure.

Referring to FIG. 28, illustrated is a top view of at least a portion of one embodiment of the apparatus 700f shown in FIG. 27f, herein designated by the reference numeral 750. The apparatus 750 includes a number of actuators 755, each of which may be substantially similar, possibly including symmetric pairs, mirror-images, or having other similar characteristics. However, for the sake of simplicity, only one of the actuators 755 is described below, although this treatment should not be interpreted as an indication of any necessity that each of the actuators 755 is identical to the others shown in FIG. 28. That is, as with the apparatus 700a-f shown in FIG. 27a-f and described above, the actuators 755 may vary even within a single embodiment. Moreover, although the embodiment depicted in FIG. 28 includes eight (8) actuators 755, other embodiments of the apparatus 750 may include a smaller or larger number of actuators 755.

Each actuator 755 includes an actuator portion 757 which may be substantially similar to the paired actuators 592 shown in FIG. 24, among others described or otherwise within the scope of the present disclosure. A connection member 758 extends between the two groups of actuator members forming the actuator portion 757. In some embodiments, the connection member 758 may be a simple, elongated structural member, possibly resembling the connection members 587 and/or the tie member 598 also shown in FIG. 24. However, as in the embodiment shown in FIG. 28, the connection member 758 may be substantially U-shaped, V-shaped, cupped, turned, or otherwise configured.

In some embodiments, this cradle- or U-shaped configuration of the connection member 758 may mitigate stress concentration at the junction between the connection member 758 and an extension member 759. The extension member 759 extends between the connection member 758 and an end effector 340, and the end effector 340 may be substantially similar to those described above. Some configurations of the connection member 758 (and/or the extension member 759) may also increase or decrease leverage relative to the force generated by the actuator portion 757, thereby customizing the force which may be applied with the extension member 759 and/or end effector 340. The configuration of the connection member 758 and/or the extension member 759 may also or alternatively increase or decrease the precision of positioning the end effector 340 and/or the total travel of the end effector 340.

In one embodiment, the two groups of actuator members forming the actuator portion 757 are configured to cooperate to translate the connection member 758, extension member 759 and end effector 340 as a one-DOF actuator. For example, one of the groups of actuator members may be configured to expand while the other group of actuator members simultaneously contract, such that the connection member 758 (and, hence, the extension member 759 and end effector 340) translate relative to an underlying substrate 105 with little or no rotation relative to the substrate. However, in another embodiment, the groups of actuator members may be configured to operate independently, thus allowing such rotation when desired. For example, the connection member 758 may be biasable, such that contraction of one of the groups of actuator members may cause the connection member 758 to constrict or deflect inwards if a corresponding expansion of the other group of actuator members is prevented.

Figure 29:
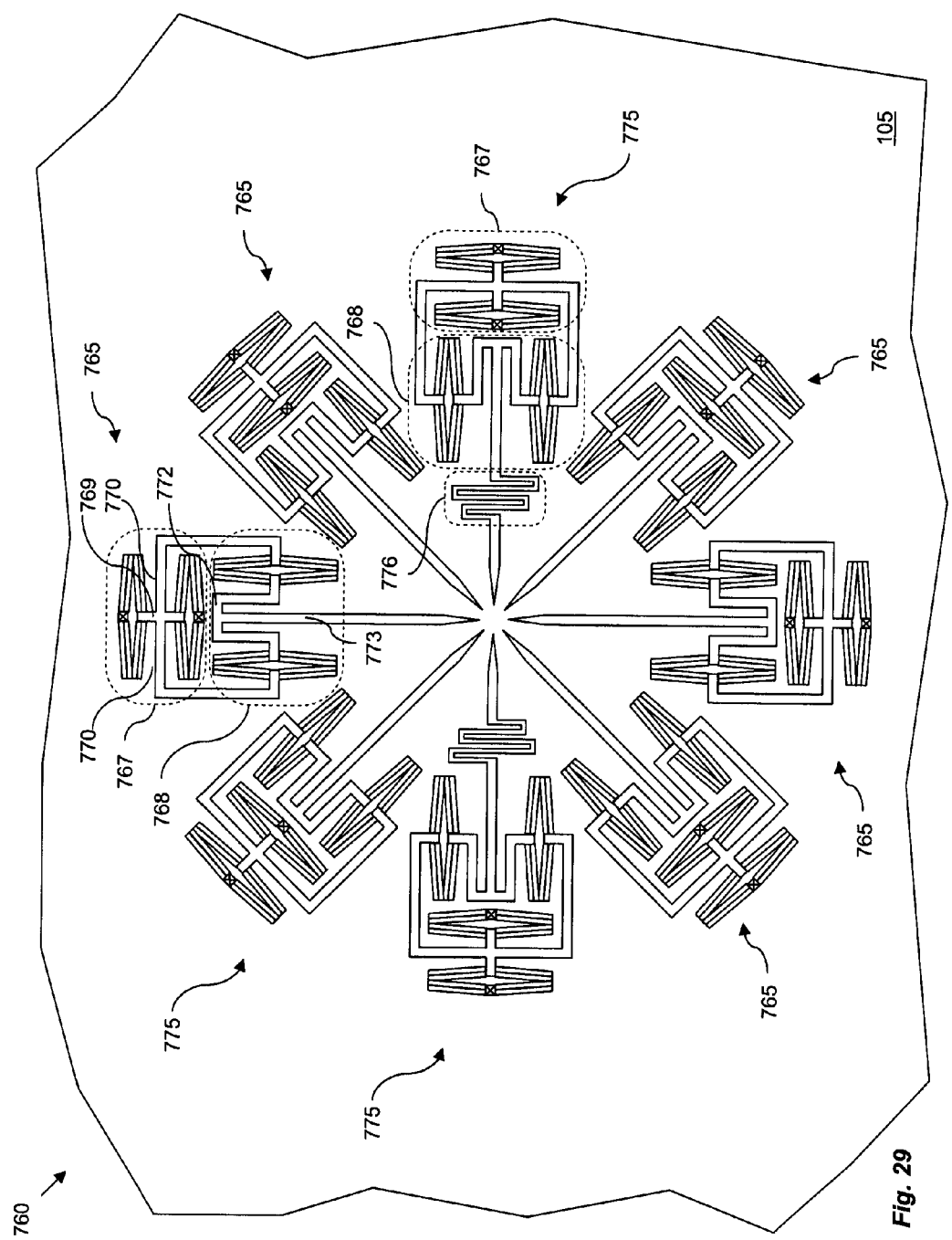
FIG. 29 is a top view of at least a portion of one embodiment of apparatus according to aspects of the present disclosure.

Referring to FIG. 29, illustrated is a top view of at least a portion of another embodiment of the apparatus 750 shown in FIG. 28, herein designated by the reference numeral 760. The apparatus 760 may be substantially similar to the apparatus 750 shown in FIG. 28, at least in the fact that the apparatus 760 includes a number of actuators 765, each of which may be substantially similar, possibly including symmetric pairs, mirror-images, or having other similar characteristics. The apparatus 760 also includes actuators 775 which may substantially be mirror-images of one another, form a symmetric pair, and/or have other similar characteristics. Although the embodiment depicted in FIG. 29 includes six (6) actuators 765 and two (2) actuators 775, other embodiments of the apparatus 760 may include a different number of the actuators 765 and/or the actuators 775.

As with the actuators 755 shown in FIG. 28, each actuator 765 includes a first-DOF actuator portion 767 and a second-DOF actuator portion 768. One or both of the first- and second-DOF actuator portions 767, 768 may be substantially similar to the paired actuators 592 shown in FIG. 24, among others described or otherwise within the scope of the present disclosure. A connection member 769 extends between the pair actuators of the first-DOF actuator portion 767, and additional members 770 extend in opposite directions from a central portion of the member 769 to opposing, outward junctions of the paired actuators of the second-DOF actuator portion 768. Consequently, the first-DOF actuator portion 767 may be configured to position the second-DOF actuator portion 768 in a first direction, such as where the paired actuators of the first-DOF actuator portion 767 are configured to operate in unison. In other embodiments, the paired actuators of first-DOF actuator portion 767 may be configured to operate independently, such that the first-DOF actuator portion 767 may be configured to position the second-DOF actuator portion 768 in more than one DOF (e.g., translation and rotation).

Another member 772 extends between the paired actuators of the second-DOF actuator portion 768. The member 772 may be substantially U-shaped, V-shaped, cupped, turned, or otherwise configured, possibly in a manner that is substantially to the connection member 758 shown in FIG. 28. An additional member 773 extends between the member 772 and an end effector 340. Thus, the second-DOF actuator portion 768 is configured to position the end effector 340 in a second direction 772, such as where the paired actuators of the second-DOF actuator portion 768 are configured to operate in unison. In other embodiments, the paired actuators of second-DOF actuator portion 768 may be configured to operate independently, such that the second-DOF actuator portion 768 may be configured to position the end effector 340 in more than one DOF (e.g., translation and rotation).

Thus, the second-DOF actuator portion 768 is configured to position the end effector 340 in at least one DOF, and the first-DOF actuator portion 767 is configured to position the second-DOF actuator portion 768 (and, hence, the end effector 340) in at least one other DOF. Consequently, the actuator 765 may be a multi-DOF apparatus operable to position the end effector 340 in at least two DOF.

The actuators 775 are substantially similar to the actuators 765, although the actuators 775 are configured to position the end effector 340 in at least three DOF. That is, the actuators 775 each include a third-DOF actuator portion 776. In one embodiment, the third-DOF actuator portion 776 may be substantially similar to the apparatus 500 shown in FIGS. 13-15, the apparatus 510 shown in FIGS. 16 and 17, the apparatus 520 shown in FIGS. 18 and 19, and/or the apparatus 530 shown in FIGS. 20 and 21, among others. Thus, for example, the first- and second-DOF actuator portions 767, 768 may be operable to position the end effector 340 in first and second mutually orthogonal directions that are each parallel to the substrate 105, and the third-DOF actuator portion 776 may be operable to position the end effector 340 in a third direction that is substantially perpendicular to the substrate 105. Of course, the first-, second- and third-DOF actuator portions 767, 768, 776 may be configured to position the end effector 340 in additional or alternative DOF in other embodiments within the scope of the present disclosure.

Figure 30:
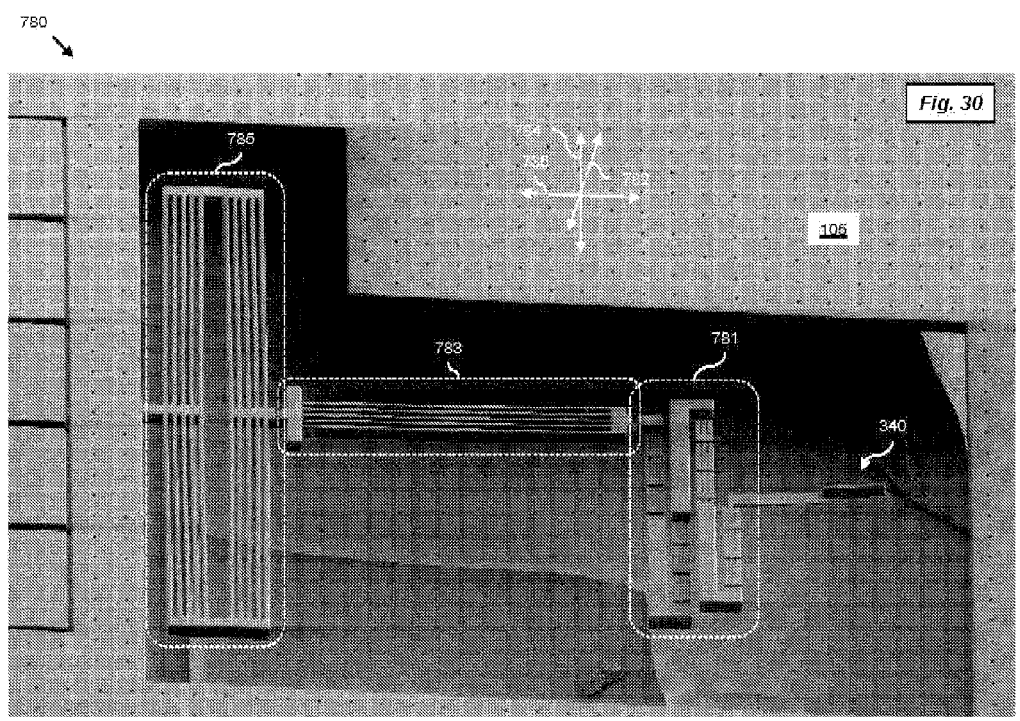
FIG. 30 is a perspective view of at least a portion of one embodiment of apparatus according to aspects of the present disclosure.

Referring to FIG. 30, illustrated is a perspective view of at least a portion of another embodiment of the actuator 775 shown in FIG. 29, herein designated by the reference numeral 780. The actuator 780 includes a first actuator portion 781 configured to position an end effector 340 in a first direction 782. The first direction 782 is substantially perpendicular to a substrate 105 on or from which the actuator 775 is formed. The first actuator portion 781 is connected in series to a second actuator portion 783, which is configured to position the first actuator portion 781 (and, hence, the end effector 340) in a second direction 784. The second direction 784 is substantially perpendicular to the first direction 782. The second actuator portion 783 is connected in series to a third actuator portion 785, which is configured to position the second actuator portion 783 (and, hence, the first actuator portion 781 and the end effector 340) in a third direction 786. The third direction is substantially perpendicular to the first and second directions 782, 784.

The first actuator portion 781 may be substantially similar to the apparatus 500 shown in FIGS. 13-15, the apparatus 510 shown in FIGS. 16 and 17, and/or the apparatus 520 shown in FIGS. 18 and 19, among others. The second actuator portion 783 may be substantially similar to the apparatus 300 shown in FIG. 6, the apparatus 360 shown in FIG. 7, and/or the actuator 460 shown in FIGS. 10 and 11, among others. The third actuator portion 785 may be substantially similar to the apparatus 400 shown in FIGS. 8 and 9, the actuator 455 shown in FIGS. 10-12, and/or the actuators 460 shown in FIG. 22, among others.

The apparatus 780 is thus a multi-DOF positioner or manipulator configured to position the end effector 340 in at least three DOF (e.g., directions 782, 784, 786). In one embodiment, the apparatus 780 may be configured for such multi-DOF positioning of the end effector 340 with nanoscale precision, such as ranging between about 1000 nm and about 100 μm. Moreover, such nanoscale precision may be applicable to several or each DOF. In addition, forces applicable with the end effector 340 via manipulation of one or more of the actuator portions 781, 783, 785 may range between about 1 µN and about 100 µN, possibly with an accuracy ranging between about 1 nN and about 1 µN.

Figure 31:
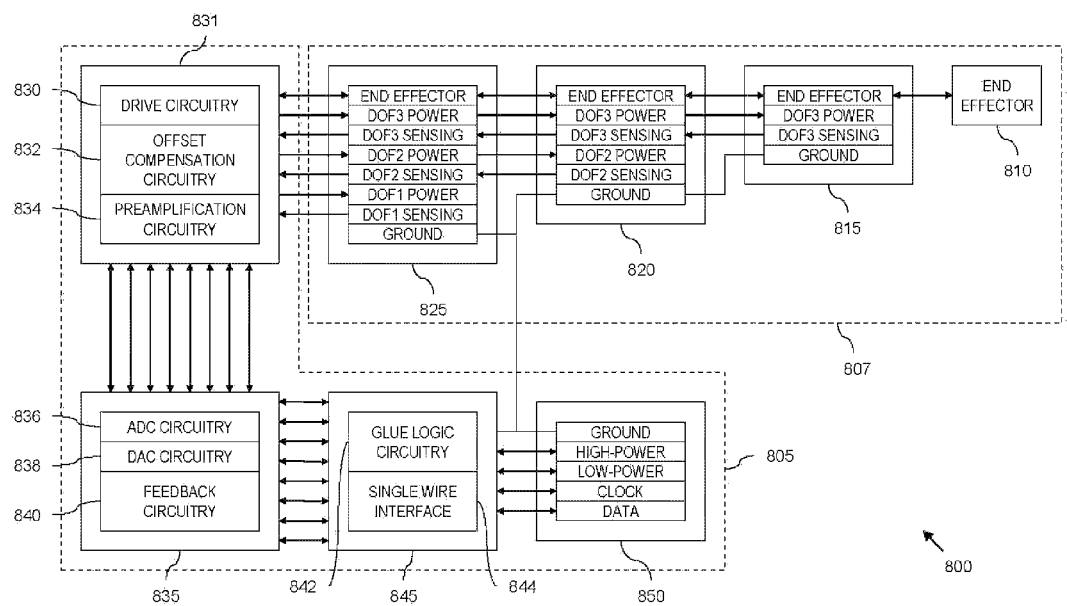
FIG. 31 is a schematic view of at least a portion of one embodiment of apparatus according to aspects of the present disclosure.

Referring to FIG. 31, illustrated is a circuit schematic of at least a portion of one embodiment of a multi-DOF apparatus 800 according to aspects of the present disclosure. The apparatus 800 may be substantially similar to the apparatus 100 shown in FIG. 1. For example, one or more aspects of circuitry 805 included in the apparatus 800 may be substantially similar to the devices 110 and/or interconnect structure 130 shown in FIG. 1, and/or one or more aspects of an actuator 807 may be substantially similar to the actuator 120 shown in FIG. 1, among others depicted in the figures of the present disclosure. In the embodiment shown in FIG. 31, the actuator 807 is a multi-DOF actuator, operable for actuation in three different DOF (DOF1, DOF2 and DOF3). Thus, for example, the actuator 807 may be substantially similar to, or have one or more aspects similar to, the apparatus 470 shown in FIG. 12, the apparatus 600 shown in FIG. 25, the apparatus 650 shown in FIG. 26, the apparatus 700a-f shown in FIGS. 27a-f, the apparatus 750 shown in FIG. 28, the apparatus 760 shown in FIG. 29, and/or the apparatus 780 shown in FIG. 30, among others.

Portions of the actuator 807 may also be electrically interconnected in a manner substantially similar to the interconnection of the devices 110 shown in FIG. 1, may include heating elements that may be substantially similar to the heating elements described elsewhere herein (e.g., see FIG. 38), and may include piezoresistive and/or other types of feedback elements or features, such as those described elsewhere herein (e.g., see FIGS. 32-38).

The actuator 807 may include an end effector 810 which may be substantially similar to one or more of the end effectors described above. The end effector 810 may include one or more electrical paths to the DOF3 actuator 815, such as for transmission of electrical signals to be employed for measurement, detection, sensing, etc.

The DOF3 actuator 815 may include pass-through circuitry for the one or more electrical paths of the end effector 810, and includes circuitry for receiving power, ground connection, and possibly sensing. For example, the sensing circuitry may sense (or be employed in the sensing, detection and/or measurement of) position, orientation, temperature, force, tension, and/or compression, among other characteristics of the DOF3 actuator 815.

The DOF2 actuator 820 may include pass-through circuitry for the one or more electrical paths of the end effector 8 10, and includes pass-through circuitry for the one or more power and sensing paths of the DOF3 actuator 815. The DOF2 actuator 820 also includes circuitry for receiving power, ground connection, and possibly sensing. For example, the sensing circuitry may sense (or be employed in the sensing, detection and/or measurement of) position, orientation, temperature, force, tension, and/or compression, among other characteristics of the DOF2 actuator 820.

The DOF1 actuator 825 may include pass-through circuitry for the one or more electrical paths of the end effector 810, and includes pass-through circuitry for the one or more power and sensing paths of the DOF3 actuator 815 and the DOF2 actuator 820. The DOF1 actuator 825 also includes circuitry for receiving power, ground connection, and possibly sensing. For example, the sensing circuitry may sense (or be employed in the sensing, detection and/or measurement of) position, orientation, temperature, force, tension, and/or compression, among other characteristics of the DOF1 actuator 825.

Circuitry 805 may include drive circuitry generally depicted in FIG. 31 and designated by reference numeral 830. The drive circuitry 830 may include, cooperate with, or otherwise be associated with offset compensation circuitry 832, which may be configured to eliminate parasitic offsets between differentially paired piezoresistors, among other functions. The drive circuitry 830 may also include, cooperate with, or otherwise be associated with preamplification circuitry 834, which may be configured to amplify signals from the tip or from a sensor, among other functions. The drive circuitry 830, offset compensation circuitry 832, and/or the preamplification circuitry 834, where these are included, may also be logically and/or geographically associated as a section, region or allocation 831. As depicted in FIG. 31, one of more portions of the circuitry 831 may be in communication with the actuator 807.

Circuitry 805 may also include processing circuitry, shown generally in FIG. 31 by reference numeral 835. The processing circuitry may include conversion circuitry, such as (without limitation) analog-to-digital circuitry 836, digital-to-analog circuitry 838, and feedback circuitry 840, among others. As depicted in FIG. 31, one or more portions of the circuitry 835 may be in communication with the circuitry 831.

Circuitry 805 may also include interface circuitry 845, which may include glue logic circuitry 842 facilitating external interfacing, and which may also include "single-wire" interface circuitry 844 facilitating the reduction of wiring passing through a chamber wall. For example, in one embodiment, a result of the circuitry 845 may be that only three wires need be passed through a chamber wall, such as one wire for power, one wire for ground, and one wire for transmitting signals, possibly bi-directional transmission such as where control signals are passed into the chamber and data signals are passed out of the chamber. As depicted in FIG. 31, one or more portions of the circuitry 845 may be in communication with the circuitry 835.

One or more portions of the circuitry 845 may also be in communication with an external interface 850. The interface 850 may be similar to the three-wire interface described above. However, as depicted in FIG. 31, the interface 850 may include separate leads for different power levels, and may also include a lead for a clock signal.

Figure 32:
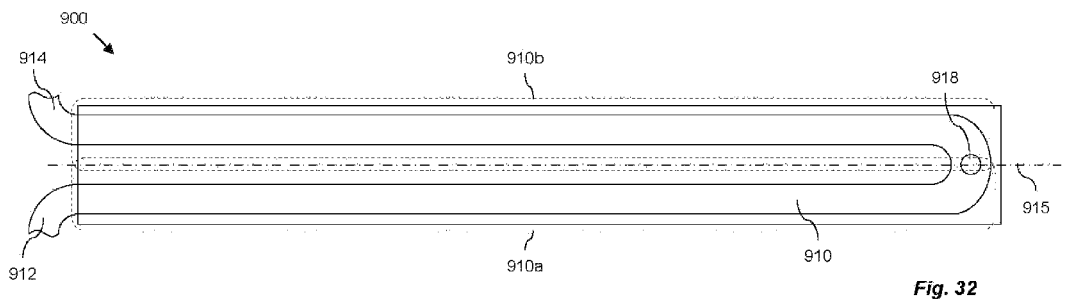
FIGS. 32 and 33 are top views each of at least a portion of various embodiments of apparatus according to aspects of the present disclosure.

Referring to FIG. 32, illustrated is a top, schematic view of at least a portion of one embodiment of an actuator 900, which may have one or more aspects substantially similar to these of one or more actuators described above (e.g., actuator 120 of FIG. 1). The actuator 900 includes a patterned section of piezoresistive material 910, which extends along a substantial length of the actuator 900. The ends 912, 914 of the piezoresistive element 910 may extend from the actuator 900, as depicted in FIG. 32, although in other embodiments the actuator 900 may include vias which land on the ends 912, 914 of the element 910 such as the via 918 landing on an approximate midpoint of the element 910 (relative to the entire length of the element 910 were it not configured in the looped profile shown in FIG. 32). As described above, the piezoresistive element 910 may be formed substantially simultaneously as gate electrode portions of transistor devices associated with the actuator 900, or may otherwise be substantially similar in composition and/or manufacture. The piezoresistive element 910 may be employed as a feedback member or element to assist in determining actual positioning of the actuator 900, as described above. Of course, the scope of the present application is not limited to the particular configuration of the element 910 shown in FIG. 32.

Figure 33:
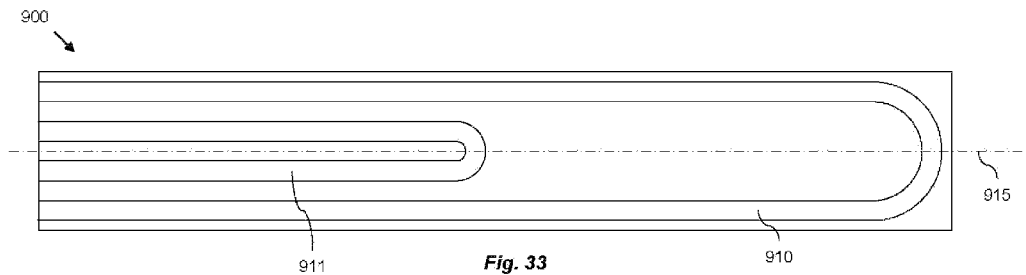

Referring to FIG. 33, illustrated is a top, schematic view of another embodiment of the actuator 900 shown in FIG. 32, in which the element 910 extends along only a portion of the length of the actuator 900. Moreover, as also shown in FIG. 33, each actuator 900 may include more than one piezoresistive element 910, including more than one element 910 operable to assist in providing feedback regarding a single actuator 900. For example, the actuator 900 shown includes a first piezoresistive element 910 and a second piezoresistive element 911, which may extend along different, possibly overlapping lengths of the actuator 900. In the embodiments of the actuator 900 shown in FIGS. 32 and 33, among other embodiments, the one or more piezoresistive elements 910, 911 included therein may be substantially centered or symmetric with respect to a centerline axis 915.

Referring to FIG. 34, illustrated is a circuit diagram of at least a portion of one embodiment of a feedback device 950 according to aspects of the present disclosure. The feedback device 950 may model and/or be employed with an embodiment of an actuator having a piezoresistive feedback element, such as the embodiments of the actuator 900 shown in FIGS. 32 and 33. The device 950 includes a signal source 952 which may provide an AC or DC signal, possibly on a selectable and/or adjustable basis. The signal propagates through the feedback element (such as element 910 or 911 of FIGS. 32 and 33), experiencing a certain amount of resistance.

For example, referring also to the actuator 900 shown in FIG. 32, the generated signal will propagate through a first segment 910a of the piezoresistive element 910 and experience a first resistance 954, and will also propagate through a second segment 910b of the element 910 and experience a second resistance 956. As the actuator 900 is operated, the change in shape (e.g., length) of the segments 910a, 910b will alter the resistance values 954, 956. The change in resistance can be detected by a detection or comparison device 958, which may be or include a comparator circuit or chip. The altered resistance may be detected along one segment 910a of the piezoresistive element 910, as shown in the circuit embodiment of FIG. 34. Alternatively, or additionally, the altered resistance can be detected along segment 910b of the piezoresistive element 910, as shown in the similar circuit embodiment depicted in FIG. 35. Alternatively, or additionally, the altered resistance can be detected along the substantial length of the piezoresistive element 910, as shown in the similar circuit embodiment depicted in FIG. 36.

Referring to FIG. 37, illustrated is a circuit diagram of at least a portion of another embodiment of the circuit arrangements shown in FIGS. 34-36, but where the reference signal of the signal source 952 is initially introduced to the midpoint of the piezoresistive element 910, such as at the via 918 shown in FIG. 32. The device 958 may then be connected to opposing ends of the piezoresistive element 910 to determine resistance differentials based on a change in shape of the actuator 900, thus providing or assisting in the provision of feedback indicative of a true position of the actuator 900 during operation.

Referring to FIG. 38, illustrated is a top view of at least a portion of one embodiment of an apparatus 970 which may be substantially similar to one or more of the actuators described elsewhere herein. For example, the apparatus 970 may be substantially similar to the apparatus 450 shown in FIGS. 10 and 11. The apparatus 970 includes a first DOF actuator 972 and a second DOF actuator 974. The first DOF actuator 972 includes a piezoresistive feedback element 910 extending within a portion of one actuation member of the actuator 972.

The first DOF actuator 972 also includes heating elements 330 which may be substantially similar to those in embodiments described elsewhere herein.

The second DOF actuator 974 also includes a piezoresistive feedback element 910 extending within a portion of one actuation member of the actuator 974. The second DOF actuator 974 may include more actuation members relative to the first DOF actuator 972 yet still only include a single piezoresistive feedback element 910. Nonetheless, the scope of the present disclosure is not limited to such embodiments. The second DOF actuator 974 also includes a number of heating elements 330 which may each be substantially similar to those in embodiments described elsewhere herein.

Thus, the present disclosure introduces an apparatus including an actuator configured for controllable deflection, and also including a piezoresistive element integral to the actuator and having first and second piezoresistive portions and a plurality of contacts. One of the plurality of contacts is configured to pass a received feedback signal through the first and second piezoresistive portions. Detection of the actuator deflection is indicated by comparison of the feedback signal as detected via at least one of the plurality of contacts that are interposed by at least one of the first and second piezoresistive portions.

The present disclosure also provides a method that includes establishing a sub-atmospheric environment within an electron microscope chamber, and subsequently processing an end effector of a positioner installed within the chamber by operating the positioner to transition the end effector towards an end effector processor installed within the chamber. The positioner includes a plurality of actuators mechanically coupled together and each individually configured to position the end effector with sub-micron precision in each of a corresponding one of a plurality of degrees-of-freedom.

A method of manufacturing an apparatus having at least one feature dimension that is less than about 1000 microns is also introduced in the present disclosure. Such method may comprise forming a patterned piezoresistive layer over a substrate, including forming a piezoresistive feedback portion of an actuator and a plurality of piezoresistive gate elements each corresponding to one of a plurality of transistor devices. A temperature-dependent deflector portion of the actuator is then provided by forming a first portion of pluralities of dielectric and conductive layers over the piezoresistive feedback portion of the actuator. A plurality of conductive members interconnecting the plurality of transistor devices is then provided by forming second portions of the dielectric and conductive layers over the plurality of transistor devices.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
    an actuator configured for controllable deflection; and
    a piezoresistive element integral to the actuator and having first and second piezoresistive portions and a plurality of contacts, wherein one of the plurality of contacts is configured to pass a received feedback signal through the first and second piezoresistive portions, and wherein detection of the actuator deflection is indicated by comparison of the feedback signal as detected via at least one of the plurality of contacts that are interposed by at least one of the first and second piezoresistive portions;

wherein the actuator is a first actuator, the apparatus further comprising a nanopositioner that includes:

an anchored portion;

an end effector;

the first actuator interposing the anchored portion and the end effector and controllably positionable in a first degree-of-freedom (DOF);

a second actuator interposing the first actuator and the end effector and controllably positionable in a second DOF, wherein the first and second actuators are collectively configured to cooperate to position the end effector with sub-micron precision in each of the first DOF and the second DOF; and at least one dedicated electrical path extending between the anchored portion and the end effector via the first and second actuators, the at least one dedicated electrical path being electrically isolated from other electrically conductive portions of the first and second actuators.

2. The apparatus of claim 1 further comprising:

a piezoresistive layer comprising a plurality of piezoresistive gate feature portions and the piezoresistive element;

an interconnect structure comprising a plurality of conductive layers each having a first thermal expansion coefficient and a plurality of dielectric layers each having a second thermal expansion coefficient; and a plurality of transistor devices interconnected by the interconnect structure and each including one of the plurality of piezoresistive gate feature portions; wherein the actuator includes portions of the pluralities of conductive and dielectric layers and is configured for temperature-driven positioning by deflection based on a difference between the first and second thermal expansion coefficients.

3. The apparatus of claim 2 wherein the piezoresistive element is one of a plurality of piezoresistive elements included in the piezoresistive layer, and wherein the first and second actuators are each one of a plurality of temperature-driven actuators each comprising one of the plurality of piezoresistive elements and portions of the pluralities of conductive and dielectric layers.

4. The apparatus of claim 2 wherein the plurality of conductive layers comprises at least one metallic layer and the piezoresistive layer comprises at least one polysilicon layer.

5. The apparatus of claim 1 wherein the first actuator is configured for first temperature-driven deflection to position the end effector in the first degree-of-freedom, and wherein the second actuator is configured for second temperature-driven deflection to position the end effector in a second degree-of-freedom, wherein the first and second actuators are directionally decoupled.

6. The apparatus of claim 1 wherein the first actuator is configured for first temperature-driven deflection to position the end effector in the first degree-of-freedom, and wherein the second actuator is configured for second temperature-driven deflection to position the end effector in a second degree-of-freedom, wherein the first and second actuators are further configured to compensate for thermal coupling resulting from either of the first and second temperature-driven deflection.

7. The apparatus of claim 1 wherein:

the first and second actuators are mechanically coupled in series or in parallel between the anchor and the end effector; and the first and second actuators are collectively configured to cooperate to exert a force with the end effector, the force having a magnitude greater than zero and less than about 50 μN.

8. The apparatus of claim 1 wherein each of the first and second actuators is configured to position the end effector with sub-micron precision in an exclusive one of the plurality of degrees of freedom.

9. The apparatus of claim 1 further comprising at least one of a proportional-integral-derivative controller, an analog-to-digital converter, a pre-amplifier gain stage, and glue logic apparatus coupled between the at least one dedicated electrical path and at least one of the first and second actuators.

10. The apparatus of claim 1 wherein the at least one dedicated electrical path includes no more than five electrical paths over which all power and control signals are received by the first and second actuators.

11. The apparatus of claim 1 wherein the at least one dedicated electrical path includes no more than three electrical paths over which all power and control signals are received by the first and second actuators.

12. The apparatus of claim 1 wherein the first and second actuators are integrally formed.

13. The apparatus of claim 1, wherein at least the nanopositioner is configured for installation within a chamber of an electron microscope.

* * * * *

UNITED STATES PATENT AND TRADEMARK OFFICE
CERTIFICATE OF CORRECTION

PATENT NO. : 7,538,470 B2
APPLICATION NO. : 11/422229
DATED : May 26, 2009
INVENTOR(S) : Niladri Sarkar It is certified that error appears in the above-identified patent and that said Letters Patent is hereby corrected as shown below:

Column 4, Line 48, please correct the numeral "18" to read --118--

Column 23, Line 52, please correct the numeral "8 10" to read --810--

Signed and Sealed this

First Day of September, 2009

David J. Kappos
*Director of the United States Patent and Trademark Office*